United States Patent [19]

Sheffield

[11] 4,065,350

[45] Dec. 27, 1977

[54] VERTICALLY STABILIZED ELONGATED CROSS-SECTION TOKAMAK

[75] Inventor: George V. Sheffield, Hopewell, N.J.

[73] Assignee: The United States Government as represented by the Department of Energy, Washington, D.C.

[21] Appl. No.: 486,926

[22] Filed: July 9, 1974

[51] Int. Cl.² .......................... G21B 1/02; H01J 7/14
[52] U.S. Cl. ................................. 176/3; 315/111.7; 176/9
[58] Field of Search .................. 176/1, 3, 4, 5, 7, 9; 315/111.1–111.7

[56] References Cited

U.S. PATENT DOCUMENTS

| 3,194,739 | 7/1965 | Kerst et al. | 176/1 |
| 3,278,384 | 10/1966 | Lenard et al. | 176/3 |
| 3,607,627 | 9/1971 | Furth et al. | 176/3 |
| 3,663,361 | 5/1972 | Yoshikawa | 176/3 |
| 3,668,067 | 6/1972 | Christofilos | 176/5 |
| 3,778,343 | 12/1973 | Coppi et al. | 176/3 |
| 3,886,402 | 5/1975 | Furth et al. | 176/3 |

OTHER PUBLICATIONS

CONF-721111, (10/20-22/72), pp. 3, 6, 677–683.
CONF-730315, (326-30173), pp. C2-1, C2-2.
CONF-740402-P1, (4/16-18/74), pp. 417–421 and 612.
Acronyms and Initialisms Dictionary, 4th Ed., Gal Research Co., (9/14/73), Crowley et al., eds., p. 572.
Physics Today (11/75), Kadamtsev et al., pp. 37–42.
Nuclear Engineering International, vol. 17, No. 198, (11/72), pp. 946–949.
Science, vol. 166, (10/17/69), Holcomb, pp. 363–364.
ERDA-28, (1/31/75), pp. 1–13.
MATT-1050, (8/74), pp. 526–541.
Scientific American, vol. 227, No. 1, (7/72), pp. 65–75.

*Primary Examiner*—Samuel W. Engle
*Assistant Examiner*—S. A. Cangialosi
*Attorney, Agent, or Firm*—Dean E. Carlson; Leonard Belkin; C. Daniel Cornish

[57] ABSTRACT

This invention provides a vertically stabilized, non-circular (minor) cross-section, toroidal plasma column characterized by an external separatrix. To this end, a specific poloidal coil means is added outside a toroidal plasma column containing an endless plasma current in a tokamak to produce a rectangular cross-section plasma column along the equilibrium axis of the plasma column. By elongating the spacing between the poloidal coil means the plasma cross-section is vertically elongated, while maintaining vertical stability, efficiently to increase the poloidal flux in linear proportion to the plasma cross-section height to achieve a much greater plasma volume than could be achieved with the heretofore known round cross-section plasma columns. Also, vertical stability is enhanced over an elliptical cross-section plasma column, and poloidal magnetic divertors are achieved.

5 Claims, 8 Drawing Figures

VERTICALLY STABILIZED ELONGATED CROSS-SECTION TOKAMAK

This invention was made in the course of, or under a contract with the United States Atomic Energy Commission.

BACKGROUND OF THE INVENTION

In the field of plasma physics, a need exists for magnetically confining a toroidal plasma column along an endless equilibrium axis in a vacuum containment means. Various means and methods have been proposed and used for this purpose, comprising the tokamak of U.S. Pat. No. 3,663,361, wherein poloidal field coil means are combined with a toroidal field and a plasma current stably to confine the plasma column in a circular cross-section. While these arrangements have been useful and have accomplished the desired confinement, they have been expensive, since they have required large diameter plasma cross-sections. Also, it has been difficult to increase the plasma volume in an equilibrium by using elliptical plasma columns, without decreasing the vertical stability of the plasma column.

SUMMARY OF THE INVENTION

This invention overcomes the difficulties and shortcomings of the heretofore known devices by adding a specific multipole forming a poloidal coil means, which is referred to herein as an octupole, to the outside of a round cross-section toroidal current carrying plasma column in a tokamak to change the plasma column into a rectangular cross-section characterized by an external separatrix. For purposes of this invention, an octupole is defined as the number of poles present at the center of the plasma vacuum space by taking away the current carrying toroidal plasma column. By taking away the plasma, the magnetic field wouldn't be square in cross-section, as understood in more detail hereinafter, and the field lines would form loops having eight poles, as understood from the Gulf General Atomic octupole shown in "Survey of the USAEC Program in Controlled Thermo-nuclear Research" June 1971. By elongating the spacing between the octupole coil means, which comprises at least four poloidal current carrying rings that are co-axial with the plasma column equilibrium axis, the plasma column cross-section is vertically elongated while the rectangular cross-section is maintained. This maintains vertical stability efficiently to increase the poloidal flux in the plasma column in linear proportion to the plasma cross-section height to achieve a much greater plasma volume than could be achieved with the heretofore known round cross-section plasma columns. Also, plasma column stability against vertical displacement is enhanced at larger volumes over elliptical cross-section plasma columns. Additionally, in another aspect, this invention provides poloidal magnetic divertors.

In one embodiment, this invention provides in a tokamak of the type having a toroidal containment means and toroidal and poloidal current carrying magnetic field producing coil means for producing a nested set of concentric, circular cross-section, toroidal magnetic surfaces confining a plasma current carrying toroidal plasma column in the containment means so that the plasma column is stably located on a vertical axis and has equal radial axes defining an endless circular equilibrium axis around an axis of rotation in the annulus of the containment means, the improvement comprising: octupole means along the equilibrium axis and around the outside of the plasma column in the space between the equilibrium axis and the axis of rotation for producing poloidal separatrices external to the plasma column having stagnation points that define the four corners of a rectangular magnetic surface for confining and shaping the circular cross-section magnetic surface into a rectangular cross-sectional shape inside the rectangular surface. With the proper selection of elements and steps, as described in more detail hereinafter, the desired vertical stability and elongated cross-section in a tokamak are achieved.

it is an object of this invention, therefore, to provide an elongated cross-section toroidal plasma column in an equilibrium having vertical stability.

The above and further novel features and objects of this invention will appear more fully from the following detailed description when read in connection with the attached drawings, and the novel features will be particularly pointed out in the appended claims.

BRIEF DESCRIPTION OF THE DRAWINGS

In the drawings, where like elements are referenced alike:

FIG. 4 is a partial cross-section of another embodiment of the shaping means of FIG. 1a;

FIG. 5 is a partial cross-section of another embodiment of the shaping means of FIG. 1a;

FIG. 6 is a partial cross-section of another embodiment of the shaping means of FIG. 1a;

DESCRIPTION OF THE PREFERRED EMBODIMENT:

It is known that a circular cross-section plasma column can be confined along an endless circular equilibrium axis by using a tokamak. A tokamak is shown and discussed in U.S. Pat. No. 3,663,361, by Shoichi Yoshikawa. Magnetic confinement and shaping of the plasma column cross-section is based on the fact that all the particles making up a particular plasma column spiral around the axis of rotation along toroidal magnetic lines of force forming toroidal magnetic surfaces, and the particles and mathematics of such confinement and shaping systems are well known in the art. The invention hereinafter described utilizes a tokamak confinement and shaping system of the type in which the space between the equilibrium axis and the axis of rotation along radial axes above and below the equilibrium axis, and around the plasma column on a vertical axis normal to the radial axes and parallel with the axis of rotation and through which the particles spiral and in which the toroidal magnetic surfaces are arranged, are subjected to specific poloidal magnetic fields produced by specific poloidal field coils in a manner described below in connection with particular configurations of these tokamak confinement and shaping systems. A mathematical treatment of the principles involved in this invention is given in my Princeton Plasma Physics Lab. Reports MATT-999 and TM-269.

Figure 1A:
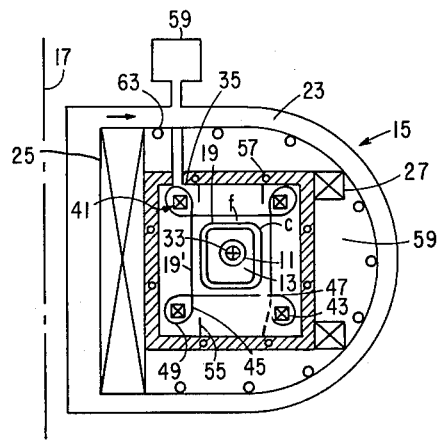
FIG. 1a is a partial cross-section of FIG. 1 with an octupole added thereto.
Figure 1:
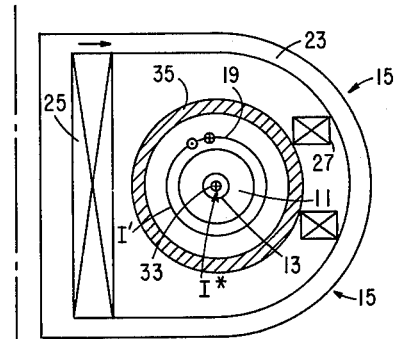
FIG. 1 is a partial cross-section of a conventional tokamak.

In order to explain how the method and apparatus of this invention accomplish the functions of magnetically confining and shaping the cross-section of a toroidal plasma column 11, reference is made to FIG. 1, wherein is illustrated an endless, circular, plasma column equilibrium axis 13 in a tokamak 15 around an axis of rotation 17, and the toroidal magnetic surfaces 19 representing the circular plasma column cross-section prior to alteration that are confined and shaped. Disposed along the length of axis 13 is a toroidal field coil 23, and poloidal coils 25 and 27 arranged concentrically around the axis of rotation 17 on a vertical axis normal to the radial axes of the plasma column 11, the functions of the poloidal coils, as is understood in the art, being usually divided up to produce the plasma current 33 along axis 13 and the vertical shaping field for vertically stabilizing the plasma column against tilting or from being displaced vertically, and for centering the plasma column and its equilibrium axis 13 in a vacuum containment means 35.

Consider the $\Psi=0$ toroidal magnetic surface 19 shown in FIG. 1 and the path taken along this surface by a charged plasma particle in either spiraling into the plane of the paper or oppositely, depending on whether the particle is negative or positive. For ease of explanation a plus indicates a current direction into the plane of the paper, and a dot indicates an opposite direction, as understood in more detail hereinafter. It will be seen that the field lines in magnetic surface 19 would ordinarily be directed around the axis of rotation in circles by the toroidal field coil 23, so that they would return to their starting point, but the plasma current 33 causes these field lines to be twisted helically around the equilibrium axis 13. Meanwhile, the poloidal shaping field coil 27 confines and centers the magnetic surface 19 formed by these twisting field lines in containment means 35.

Magnetic surface 19 represents the outer, or $\Psi=0$, one of a concentric set of toroidal nested circular cross-section magnetic surfaces, or tubes for ease of explanation, and it will be understood that the equilibrium properties of the tokamak of FIG. 1 for favorable stability are selected with a separatrix inside or outside of the plasma region in containment means 35. A separatrix, which is defined herein in accordance with the well known definition in U.S. Pat. No. 3,607,627, is a magnetic flux surface, in a set of nested magnetic surfaces, outside of which the magnetic surfaces have a different shape from those inside. The stagnation point is the point from which the separatrix takes on its different shape, as understood from the above-cited patent and "Plasma Physics", I.A.E.A., Vienna, 1965, p. 391. As understood in the art, the $\Psi=0$ magnetic surface is the outer surface corresponding to the outer edge of the confined plasma region, and in accordance with this invention shell currents can occur at or near this outer edge, as described in more detail hereinafter. A theoretical discussion of the $\Psi=0$ magnetic surface is provided in U.S. Pat. No. 3,278,384 to Lenard etal.

Should specific spaced apart multipolar poloidal field coil means 41, referred to hereinafter as an octupole, be added to the apparatus of FIG. 1 outside the plasma region of column 11 in containment means 35, in accordance with this invention, the magnetic surface 19 is shaped into a non-circular, non-elliptical rectangular configuration having a separatrix outside the plasma region in the containment means 35, as shown in FIG. 1a. Moreover, vertical stability is maintained although the spaces between the individual multipolar means are expanded vertically and made larger by spreading them farther apart vertically to elongate the plasma column cross-section contained in the shaped magnetic surface 19 into a truly elongated shape having a larger vertical dimension than horizontal dimension. This efficiently increases the poloidal flux in the plasma column in linear proportion to the plasma cross-section height to achieve a much greater plasma volume than could be achieved with the heretofore known round cross-section plasma columns. Also, the vertical stability is enhanced over an elliptical cross-section plasma column. Still further, the adding of the specific multipole of this invention outside the plasma column, provides poloidal divertors that are selectively arranged, shaped and/or actuated, as understood in more detail hereinafter.

Referring now to FIG. 1a for a further description of the multipole 41 of this invention, in one embodiment, it is defined herein as an octupole without magnetic levitation means or internal supports in the plasma column 11. To this end, in this embodiment, four ring-shaped, first poloidal conductor means 43 having a rectangular arrangement in cross-section, are located to extend in concentric circles around the axis of rotation 17 on the top and bottom sides of the plasma column 11 in the space between the plasma column 11 and the vacuum containment means. These coil means are energized in series in the same directions as each other and the plasma current 33 with currents corresponding to the plasma current 33 with a current sufficient selectively to shape the round cross-section $\Psi=0$ magnetic surface 19 of FIG. 1 by pulling it into the rectangular shaped $\Psi=0$ magnetic surface 19 having four flats $f$ defined by four corners $c$ for confining the shape rectangular cross-section plasma column 11 of FIG. 1a, and to produce poloidal separtices 45 external to the shaped plasma column 11 having stagnation points 47 that define the four corners of a rectangular shaped magnetic surface 19 external to and around the $\Psi=0$ surface 19, where $\Psi$ is the poloidal flux contained in the plasma in webers, so that the latter forms the outer edge of the confined plasma column region, and the former form poloidal diverters 49. To this end, the four ring-shaped conductor means 43, which are parallel and arranged in sets in the space between the plasma column and the vacuum containment means 35, curve the separatrices 45 around a portion of the conductor means 43 in four closed lobes from the four stagnation points 47. As shown in FIG. 1a, the containment means 35 is rectangular in cross-section, and outside the conductor means 43, but it can be any shape.

By vertically elongating the spacing between the four respective conductor means 43, the plasma column height is corresponding elongated in cross-section so that the height of the plasma column is greater than its width. To this end, the spacings between the respective conductor means 43 of FIG. 1a are expanded vertically and made larger within the stability limits of the plasma column. Thus, for example, the vertical elongated vs stability is adjusted by reference to the semi-axis ratio and the restoring force $F_2/\Delta$ due to the poloidal flux per unit displacement.

It has been found that the rectangular plasma column cross-sectional shape with a uniform plasma current 33 is most advantageous since it produces the longest stable elongation, while the parabolic current for a like shape produces a slightly larger restoring force at a small elongation, and both these cases are more stable than comparable elliptical elongations. The uniform and/or parabolic plasma currents 33 are selectively chosen by a suitable control. While switches and adjustable resistances are normally used, it will be understood that a computer controlled current, and the selective arrangement of the respective windings are within the skill of the art to this end.

While the divertor 49 of FIG. 1a comprises toroidal baffles 55 connected to the inside of the containment means 35 around the top and bottom of the respective conductor means 43, a wide range of arrangements are possible, as are the cooling means therefor. Advantageously, water cooling coils 57 cool the baffles and pumps 59 remove the impurities and reaction products that follow the separatrices 45 into the divertor chambers 49. Suitable poloidal control coils 63 within the skill of the art are added as desired.

The resultant magnetic field lines and plasma parameters are determined by conventional apparatus. For example, the resultant magnetic field lines and their corresponding magnetic surfaces, comprising surfaces 19 and 19', are measured, determined, and varied with conventional controls, and probes or injected particles. One system is described in U.S. Pat. No. 3,580,802. The plasma parameters are determined by convential Thompson scattering or other probes, such as the probe described in U.S. Pat. No. 3,171,788 and/or the rf system described in U.S. Pat. No. 3,265,967.

Figure 2:
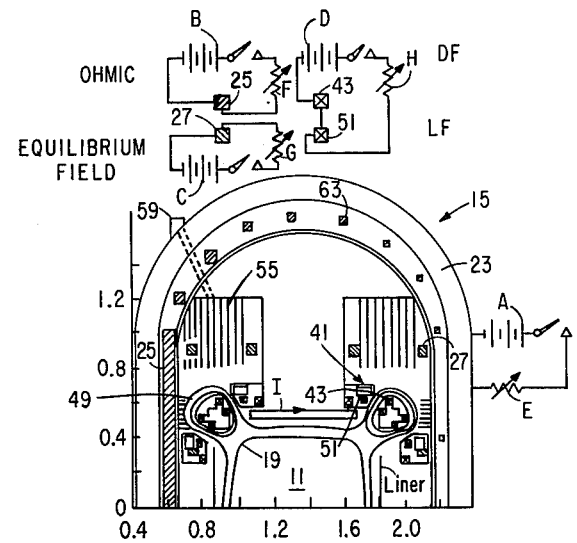
FIG. 2 is a partial cross-section of the octupole of FIG. 1a, showing additional elements therefor.

In the modification shown in FIG. 2, poloidal rings 51 having currents opposite to the currents in rings 43 are added on either side of each of the rings 43 of FIG. 1 to push the flats $f$ of the rectangular cross-section shown in FIG. 1a, thus to save current in conductors 43 by providing both pushing and pulling of the circular field line cross-section of FIG. 1. The rings shown, comprise divertor field DF coils having current in one direction, and limiter field LF coils having current in the opposite direction. This figure shows a general layout of the octupole 41 of this invention added to a tokamak to form an experimental reactor having toroidal field TF coils 23, and poloidal equilibrium field EF coils, corresponding to the poloidal field shaping SF coils of FIG. 1a. The individual sources A, B, C and D are conventional, as are the controls E, F, G and H. Also, induced reflector currents I for initially centering the plasma are conventional.

Advantageously, the baffles 55 are gettered by a conventional titanium getterer and evacuated by conventional vacuum pumps 59, and the individual coils are contained in coil cases so that the divertor DF coils form neutralizer plates for neutralizing the ions extracted from the outside of the plasma column 11 into the divertors 49. Also, a suitable liner formed by a fixed limiter plate attached to the vacuum containment means 35, limits the divertor aperture opening. Since the suspension means for the described coil means, baffles, and the limiter plates are equivalent and understood in the art, these are not shown for ease of explanation, particularly since they are incorporated into existing tokamaks so that use is made of the well known techniques for forming them. Also, they are described and shown in FIG. 9 of the Princeton University Report entitled "Design Considerations for the PDX", Sept. 7, 1973, in connection with the known use thereof in the FM-1 divertor at the Princeton Plasma Physics Lab.

Figure 2A:
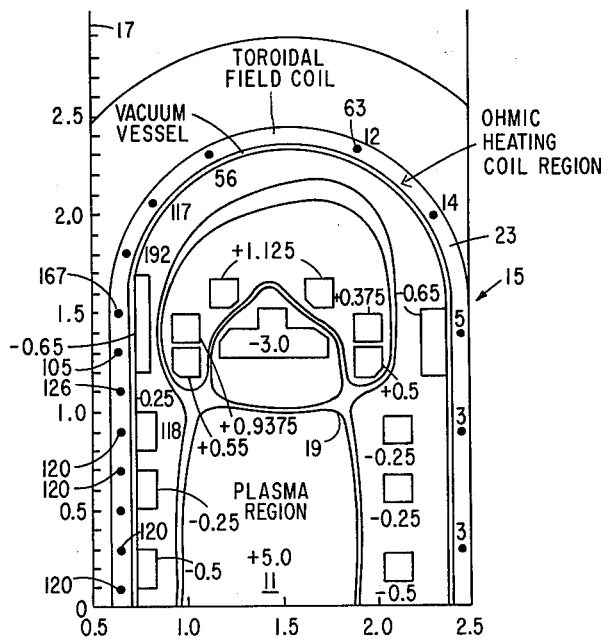
FIG. 2a is a partial cross-section and graphic illustration of another embodiment of the apparatus of FIG. 2.

In the modification shown in FIG. 2a, the currents and geometry of the various coil means are shown. Here a central toroidal divertor is provided, which in cross-section is inside an outer toroidal divertor forming a selected poloidal magnetic limiter around the plasma column.

In the modifications shown in FIGS. 3–6 the self consistent plasma equilibria form a "square" plasma cross-section, an intermediate elongation, a maximum elongation and a D-shaped (or mirror image) divertor, by adjusting the conductors and currents as illustrated in the respective drawings.

In operation, the multipole 41 of this invention is incorporated in the existing ST tokamak at Princeton U, so that use is made of the well known techniques for forming the plasma column energizing the windings thereof, and confining and shaping the toroidal magnetic surfaces and separatrices, as described in the above cited U.S. Patents. To this end, conventional controls E, F, G and H having conventional switches, transmit series current from separate sources A, B, C and D to the respective toroidal field coils 23, the ohmic heating poloidal field coils 25, the poloidal shaping field coils 27, and the oppositely energized poloidal octupole conductors 43 and 51 referred to in FIG. 2 as DF and LF coils. Passive inductive currents I in loops, which are known, may also be used to center the plasma columns initially. The control G for the shaping field coils, and the control for the DF and LF coils may be combined and connected to the same source, so that the shape of the current pulses therefor correspond to the EF or SF pulse, and to the TF coil pulse. It is understood, however, that the multipole 41 of this invention may be incorporated in any tokamak, such as the Princeton U. PLT Large Torus, PDX divertor experimental reactor, or the proposed two component or full scale device; also, the pulses can be of relatively long duration by suitably changing the currents in the described conductors, as described in co-pending application Ser. No. 416,902, filed Nov. 11, 1973, by Bonanos et al now abandoned. In all cases, the separatrices 45 are outside the confined plasma region of plasma column 11. Also, the described system is entirely different from the octupoles known heretofore, such as the levitated octupole described on pages 14 or 20 of "Survey of the U.S. A.E.C. Program in Controlled Thermonuclear Research" June 1971. For example, the tokamak of the invention has larger volumes leading to improved plasma parameters. Also, the octupole of this invention is not levitated or supported in the plasma.

The fact that tokamak type devices with elongated cross-sections appear to have improved plasma parameters leads to the question of the stability of these configurations against vertical translation, which can be studied and analyzed by a computer code given in Princeton U. Report TM-269. The model used for this study, is shown schematically in FIG. 1 of MATT-999, and the solution has two parts, the details of which are given in the Appendix to that report. First, an arbitrary current is distributed over the plasma region of the plasma column 11 and the external shell currents $I'$ thereof are computed, which make the edge of the plasma region the $\Psi = 0$ magnetic surface 19. These shell currents are often referred to as skin currents due to vertical displacement of the plasma column, which acts like a superconductor medium with patterns frozen therein.

The second part of the solution involves translating the plasma region of plasma column 11, while holding constant the external shell currents $I'$: A new distribution of plasma current 33 is computed which maintains constant all the flux values on the edge and inside the plasma region of plasma column 11. This new distribution of plasma current 33 interacts with the magnetic field of the external shell currents I' to give a net force on the plasma related to the displacement. This force is either in the same or the opposing direction as the translation indicating instability or stability, respectively, as understood from FIG. 2 of MATT-999.

Solutions were carried out for both elliptical and rectangular cross-section plasma regions with both uniform and parabolic current distributions, as shown in the latter above-mentioned FIG. 2, with the restoring force per unit displacement plotted against the displacement semi-axis ratio of height to width of the plasma column 11.

In the operation of one embodiment, stabilization is provided by distributing over the plasma region an arbitrary current and external shell currents computed to make the edge of the plasma region the $\Psi=0$ magnetic surface. Thereupon, the plasma region is translated while maintaining the plasma current distribution in accordance with the value for maintaining all the flux values on the edge and inside of the plasma region constant for effecting a new plasma current distribution that interacts with the magnetic field of the external current shell to give a net force on the plasma related to the displacement due to said translating. Moreover, the shell and plasma currents produce an external magnetic limiter and a poloidal diverter for removing impurities and reaction products.

EXAMPLE I

In one example, the described tokamak is energized to produce a plasma column major radius for toroidal equilibria of between 1.275 and 1.475 meters, and an area of plasma cross-section of 0.98 square meters. An octupole is added around the outside of the plasma column in the space between the plasma column and the vacuum containment means for the plasma column, with the octupole being supported on the inside of the containment means so that the current is fed there through with vacuum tight insulation from the same source as the poloidal field shaping coils and is in series therewith. The same computer controlled controls are also used therefor. Thus, the octupole is not levitated, is not inside the plasma column, and is completely external to the plasma column.

For a uniform plasma current, an elliptical cross-section plasma column 11 becomes unstable at a semi-axis ratio of 1.5, while the rectangular cross-section becomes unstable at 4.2. For parabolic plasma current distributions, the ellipse goes unstable at 1.6 and the rectangle at 3.2.

Two first (LF) rings and eight (DF) rings make up one poloidal conductor means at each corner of the rectangular plasma column so that four (DF) rings are inside the toroidal loop which in cross-section forms a separatrix circle from a stagnation point, and four (DF) rings are outside the loop on each side of the described circle. This configuration also produces a selected magnetic limiter, comparable to the metallic limiters known heretofore.

EXAMPLE II

The steps of Example I are repeated, and the poloidal coils are energized by the described controls to produce a poloidal flux for equilibria satisfying the equation $$r\frac{\delta}{\delta r} \cdot \frac{1}{r} \cdot \frac{\delta\psi}{\delta r} + \frac{\delta^2\psi}{\delta z^2} = r^2 a + R^2 b \quad (1)$$

where $r$ is the minor radius of the rectangular plasma column,
$R$ is the radius of magnetic axis
$r$ is one of the cylindrical coordinates
$z$ is another cylindrical coordinate
$a$ and $b$ are constants (depending on the peculiar solution to the equation desired)

The solutions were used to generate a graph of $a$ vs $R^2 b$ on which various constant parameter contours were plotted, comprising toroidal pressure ratio $\beta$ or plasma to magnetic-pressure, and safety factors $q$ in axis, as understood from p. 65 et seq of the July 1972 Scientific-American, where the plasma current is kept below the Kruskal-Shafranov limit by a safety factor that is usually taken to be between 2.5 and 3, and while the aspect ratio $R/a$ of major to minor plasma column radius is smaller than 1/3, where the poloidal magnetic field is weaker than the toroidal magnetic field.

Various equilibria were generated using the equations of Appendix I of TM-269 applied within the constraints shown in FIG. 1 thereof. The resulting data are tabulated in Table I.

This data includes the following quantities:

$a$ Defined in Eq. (1)
$b$ Defined in Eq. (1)
$R$ Radius of magnetic axis (meters)
$P_o$ Pressure at axis (Newton/Square meter)
$\beta$ Toroidal pressure ratio on axis
$q$ Safety factor on axis
$\Psi$ Poloidal flux contained in plasma (Webers)

The tables were used to generate graphs showing how the plasma current and poloidal flux vary with semi-axis ratio for the described equilibria with axial toroidal field (TF), major radius, minor semi-axis, $\beta$, and safety factor $q$ held constant. The result was that the poloidal flux was proportional to the semi-axis ratio, while the plasma current was proportional to the semi-axis ratio raised to the 1.8 power.

EXAMPLE III

The steps of Example II are repeated so that the divertor controls the ion mixture in the tokamak, and so that the disadvantages of impurities and reaction product build-up are avoided. Also, the advantages of this control, comprise reducing the ion temperature required for a thermally stable, steady-state tokamak reactor, and shaping the current-density profile by appropriate distribution of mean ionic charge (Z effective) as a function of plasma radius.

In optimizing the shaping, the effect of the location of the innermost separatrix cross-over X-points for MHD stability are tested by slight variation of the poloidal field coil currents. A "D" shaped magnetic surface 19' is produced to enhance MHD-stability, while its mirror image reduces MHD-stability, and the effects on plasma confinement and divertor efficiency are optimized.

EXAMPLE IV

The steps of Example III are repeated at a central toroidal field strength of 24 kG, with an aspect ratio $R/a=4$, and a plasma current ranging from 500 kA to 1.5 MA (at $q=3$, depending on the degree of vertical elongation). An equivalent plasma current I* for comparison with the round cross section plasma column of FIG. 1 ranges from 500 kA to 1.0 MA.

EXAMPLE V

The steps of Example IV are repeated with an initial ohmic heated plasma in the range $T_e \sim T_i \sim 1 - 2$ keV for densities of $\sim 5.10^{13}$cm$^{-3}$, and neutral-beam and $rf$ heating at powers in the range of 2-5 MW multiplied the temperature so as to approach the MHD $\beta$-limits.

EXAMPLE VI

The steps of Example V are repeated. Following optimization, reactor-like plasma parameters: $5 \times 10$ keV temperatures at $1-2 .10^{14}$cm$^{-3}$ plasma particle number densities are employed with a central toroidal field strength of 48 kG. with corresponding doubling of the plasma currents in the configuration of FIGS. 3-6.

EXAMPLE VII

The steps of Example IV are repeated with poloidal-field coils of the divertor forming an integral assembly, which is displaced manually to provide increasing degrees of plasma elongation, as shown in FIGS. 3 - 6 of Princeton Report Sept. 7, 1973, on "Design and Construction of the PDX". The octupole set of poloidal (vertical) field coils is spaced to match the increasing plasma elongation. In this example, the poloidal OH air transformer coil is fully decoupled from the divertor (octupole) and poloidal (vertical) field coils (which add up to zero net ampere turns around the torus axis). It is installed outside the vacuum chamber, prior to assembly of the toroidal-field coil system.

The vacuum containment means is made of stainless steel, with poloidal breaks to permit application of the toroidal emf by the transformer. The divertor and poloidal shaping-field coils are housed individually in lightweight vacuum shells. The divertor throat is defined by moveable baffles.

EXAMPLE VIII

The steps of Example VI are repeated using the modifications in the geometry, spacing, and currents for the multipole of this invention shown in FIGS. 3 - 6, and others for producing self-consistent plasma equilibria for the following special cases:

1. roughly "square" plasma with all cross-over points (x) on the separatrices connected to the divertor for up to 24 kG to 48 kG central toroidal fields and currents of up to 1 MA;
2. a plasma of intermediate elongation; and an equivalent plasma current I* of 750 kA at a 24 kG central toroidal field strength;
3. a plasma of maximum elongation; and an equivalent plasma current I* of up to 1 MA at 24 kG, 2 MA at 48 kG, and actual plasma currents of up to 1.5 MA at 24 kG and 3.0 MA at 48 kG.
4. D-shaped (and mirror-image D-shaped) magnetic surfaces 19 and/or 19' produced by minor adjustment of the poloidal-field coil currents connected to the outer part of the divertor.

EXAMPLE IX

The steps of Example VII are repeated with its currents shown in FIGS. 3 - 6 wherein various poloidal control coils 63 are located on the exterior of the toroidal field coils. Suitable coils and control currents are those shown, and those used in co-pending applications Ser. No. 379,870, filed July 16, 1973, by Uffe Christensen.

EXAMPLE X

The steps of Example VIII are repeated using the relative poloidal shaping and confining coil geometry, spacing and current directions as shown in FIGS. 3 - 6, where plus is into the plane of the paper and minus is opposite.

Figure 3:
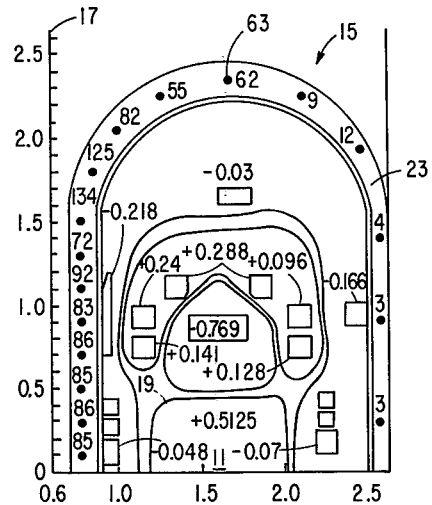
FIG. 3 is a partial cross-section of the apparatus of FIG. 1a illustrating another embodiment of the shaping means thereof.
Figure 4:
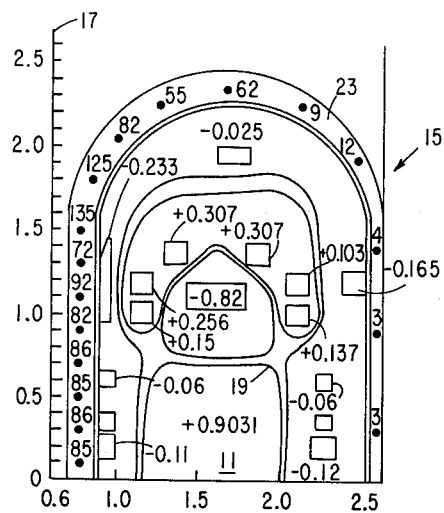
Figure 5:
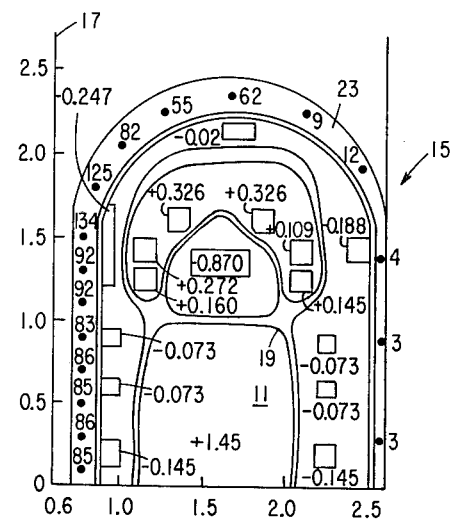
Figure 6:
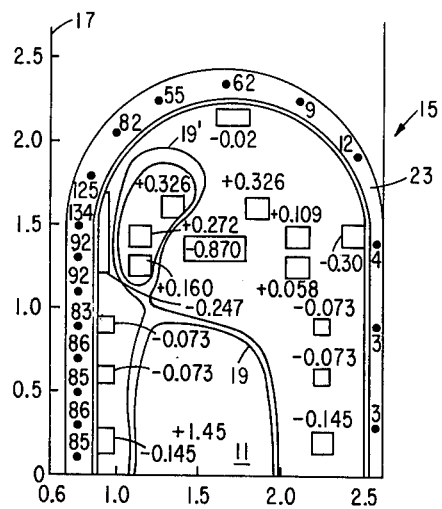

FIG. 3 is a computer calculated self-consistent plasma equilibrium with a divertor. This is the special case of a roughly "square" plasma cross-section, with all cross over x points of the separatrix connected to the divertor. For a 24 kG - 48 kG central toroidal field, the plasma current is 1 MA. In FIG. 4 for intermediate elongation, the equivalent plasma current I* is 750 kA at 24 kG. In FIG. 5 for a plasma of maximum elongation, the equivalent plasma current I* is 1 MA at 24 kG, and 2 MA at 48 kG (actual plasma currents are 1.5 MA at 24 kG and 3.0 MA at 48 kG). FIG. 6 shows a D-shaped (cross-section) plasma produced by minor adjustment of the poloidal field currents within the skill of the art based on this disclosure, and includes a mirror-image D-plasma.

In the case shown in FIG. 2a, the respective currents correspond to the values, as illustrated: $-0.05$, $-0.25$, $-3.0$, $-0.65$, $-0.05$, $+1.125$, $+0.0375$, $+0.0375$, $+0.55$ and $+0.5$. Likewise, in FIGS. 3 - 6 the currents correspond to the values illustrated.

This invention provides a non-circular, rectangular cross-section, toroidal plasma column in a tokamak so that use is made of the well-known techniques for forming toroidal magnetic surfaces and confining and shaping them, as well as the toroidal plasma column contained therein, so as to provide external separatrices. This invention employs a specific poloidal multipole called an octupole that doesn't require levitation or plasma internal supports, and the plasma column is stably elongated in height by spreading the space between the octupole means. This has the advantage that the elongation increases the poloidal flux in the plasma columns in linear proportion to the plasma height to achieve a much greater plasma volume than an equivalent round cross-section plasma column. Also, enhanced vertical stability is achieved over elliptical plasma cross-sections.

TABLE I

RECTANGULAR CROSS SECTION EQUILIBRIA
AXIAL FIELD = 2.3000 TESLA
MAJOR RADIUS = 1.4000 METERS
MINOR SEMI-AXIS = 0.4000 METERS
RATIO OF SEMI-AXES = 1.0000
PLASMA CURRENT = 200000.00 AMPERES

| A | B | R | PO | BETA | Q | PSI |
|---|---|---|---|---|---|---|
| 0.0 | −1.666 | 1.4200 | 0.0 | 0.0 | 8.496E 00 | 1.548E-01 |
| −0.371 | −1.300 | 1.4280 | 1.169E 03 | 5.767E-04 | 8.324E 00 | 1.564E-01 |
| −0.742 | −0.933 | 1.4440 | 2.367E 03 | 1.194E-03 | 8.032E 00 | 1.583E-01 |

TABLE I-continued

| | | | | | | |
|---|---|---|---|---|---|---|
| −1.113 | −0.581 | 1.4600 | 3.600E 03 | 1.858E-03 | 7.682E 00 | 1.605E-01 |
| −1.484 | −0.247 | 1.4680 | 4.874E 03 | 2.545E-03 | 7.395E 00 | 1.630E-01 |
| −1.854 | 0.080 | 1.4760 | 6.194E 03 | 3.271E-03 | 7.094E 00 | 1.657E-01 |
| −2.225 | 0.396 | 1.4920 | 7.564E 03 | 4.084E-03 | 6.659E 00 | 1.686E-01 |
| −2.596 | 0.706 | 1.5000 | 8.989E 03 | 4.909E-03 | 6.339E 00 | 1.718E-01 |
| −2.967 | 1.009 | 1.5080 | 1.047E 04 | 5.782E-03 | 6.022E 00 | 1.750E-01 |
| −3.338 | 1.320 | 1.5080 | 1.201E 04 | 6.636E-03 | 5.841E 00 | 1.785E-01 |
| −3.709 | 1.614 | 1.5160 | 1.361E 04 | 7.607E-03 | 5.535E 00 | 1.820E-01 |

PLASMA CURRENT = 400000.00 AMPERES

| A | B | R | PO | BETA | Q | PSI |
|---|---|---|---|---|---|---|
| 0.0 | −3.331 | 1.4200 | 0.0 | 0.0 | 4.264E 00 | 3.097E-01 |
| −0.742 | −2.601 | 1.4280 | 4.677E 03 | 2.293E-03 | 4.174E 00 | 3.128E-01 |
| −1.484 | −1.865 | 1.4440 | 9.468E 03 | 4.757E-03 | 4.025E 00 | 3.166E-01 |
| −2.225 | −1.162 | 1.4600 | 1.440E 04 | 7.411E-03 | 3.846E 00 | 3.210E-01 |
| −2.967 | −0.493 | 1.4680 | 1.950E 04 | 1.017E-02 | 3.700E 00 | 3.260E-01 |
| −3.709 | 0.161 | 1.4760 | 2.477E 04 | 1.309E-02 | 3.546E 00 | 3.314E-01 |
| −4.451 | 0.793 | 1.4920 | 3.026E 04 | 1.637E-02 | 3.326E 00 | 3.373E-01 |
| −5.192 | 1.412 | 1.5000 | 3.595E 04 | 1.971E-02 | 3.163E 00 | 3.435E-01 |
| −5.934 | 2.019 | 1.5080 | 4.188E 04 | 2.327E-02 | 3.002E 00 | 3.501E-01 |
| −6.676 | 2.641 | 1.5080 | 4.803E 04 | 2.676E-02 | 2.909E 00 | 3.569E-01 |
| −7.418 | 3.228 | 1.5160 | 5.444E 04 | 3.073E-02 | 2.754E 00 | 3.641E-01 |

PLASMA CURRENT = 600000.00 AMPERES

| A | B | R | PO | BETA | Q | PSI |
|---|---|---|---|---|---|---|
| 0.0 | −4.997 | 1.4200 | 0.0 | 0.0 | 2.861E 00 | 4.645E-01 |
| −1.113 | −3.901 | 1.4280 | 1.052E 04 | 5.108E-03 | 2.797E 00 | 4.692E-01 |
| −2.225 | −2.798 | 1.4440 | 2.130E 04 | 1.062E-02 | 2.693E 00 | 4.749E-01 |
| −3.338 | −1.743 | 1.4600 | 3.240E 04 | 1.659E-02 | 2.570E 00 | 4.815E-01 |
| −4.451 | −0.740 | 1.4680 | 4.386E 04 | 2.283E-02 | 2.469E 00 | 4.889E-01 |
| −5.563 | 0.241 | 1.4760 | 5.574E 04 | 2.947E-02 | 2.363E 00 | 4.971E-01 |
| −6.676 | 1.189 | 1.4920 | 6.808E 04 | 3.697E-02 | 2.213E 00 | 5.059E-01 |
| −7.789 | 2.118 | 1.5000 | 8.090E 04 | 4.466E-02 | 2.102E 00 | 5.153E-01 |
| −8.901 | 3.028 | 1.5080 | 9.423E 04 | 5.287E-02 | 1.991E 00 | 5.251E-01 |
| −10.014 | 3.961 | 1.5080 | 1.081E 05 | 6.101E-02 | 1.926E 00 | 5.354E-01 |
| −11.127 | 4.842 | 1.5160 | 1.225E 05 | 7.032E-02 | 1.820E 00 | 5.461E-01 |

PLASMA CURRENT = 800000.00 AMPERES

| A | B | R | PO | BETA | Q | PSI |
|---|---|---|---|---|---|---|
| 0.0 | −6.662 | 1.4200 | 0.0 | 0.0 | 2.164E 00 | 6.193E-01 |
| −1.484 | −5.201 | 1.4280 | 1.871E 04 | 8.956E-03 | 2.112E 00 | 6.256E-01 |
| −2.967 | −3.731 | 1.4440 | 3.787E 04 | 1.869E-02 | 2.031E 00 | 6.332E-01 |
| −4.451 | −2.323 | 1.4600 | 5.760E 04 | 2.930E-02 | 1.934E 00 | 6.420E-01 |
| −5.934 | −0.986 | 1.4680 | 7.798E 04 | 4.046E-02 | 1.855E 00 | 6.519E-01 |
| −7.418 | 0.322 | 1.4760 | 9.910E 04 | 5.245E-02 | 1.771E 00 | 6.628E-01 |
| −8.901 | 1.585 | 1.4920 | 1.210E 05 | 6.607E-02 | 1.656E 00 | 6.745E-01 |
| −10.385 | 2.825 | 1.5000 | 1.438E 05 | 8.014E-02 | 1.569E 00 | 6.870E-01 |
| −11.868 | 4.038 | 1.5080 | 1.675E 05 | 9.533E-02 | 1.483E 00 | 7.002E-01 |
| −13.352 | 5.281 | 1.5080 | 1.921E 05 | 1.105E-01 | 1.431E 00 | 7.139E-01 |
| −14.836 | 6.455 | 1.5160 | 2.178E 05 | 1.281E-01 | 1.349E 00 | 7.282E-01 |

PLASMA CURRENT = 1000000.00 AMPERES

| A | B | R | PO | BETA | Q | PSI |
|---|---|---|---|---|---|---|
| 0.0 | −8.328 | 1.4200 | 0.0 | 0.0 | 1.750E 00 | 7.741E-01 |
| −1.854 | −6.502 | 1.4280 | 2.923E 04 | 1.375E-02 | 1.705E 00 | 7.820E-01 |
| −3.709 | −4.664 | 1.4440 | 5.917E 04 | 2.882E-02 | 1.635E 00 | 7.915E-01 |
| −5.563 | −2.904 | 1.4600 | 8.999E 04 | 4.540E-02 | 1.554E 00 | 8.025E-01 |
| −7.418 | −1.233 | 1.4680 | 1.218E 05 | 6.298E-02 | 1.486E 00 | 8.149E-01 |
| −9.272 | 0.402 | 1.4760 | 1.548E 05 | 8.206E-02 | 1.416E 00 | 8.285E-01 |
| −11.127 | 1.981 | 1.4920 | 1.891E 05 | 1.039E-01 | 1.320E 00 | 8.432E-01 |
| −12.981 | 3.531 | 1.5000 | 2.247E 05 | 1.268E-01 | 1.247E 00 | 8.588E-01 |
| −14.836 | 5.047 | 1.5080 | 2.617E 05 | 1.517E-01 | 1.176E 00 | 8.752E-01 |
| −16.690 | 6.601 | 1.5080 | 3.002E 05 | 1.771E-01 | 1.131E 00 | 8.924E-01 |
| −18.544 | 8.069 | 1.5160 | 3.402E 05 | 2.066E-01 | 1.062E 00 | 9.102E-01 |

PLASMA CURRENT = 1200000.00 AMPERES

| A | B | R | PO | BETA | Q | PSI |
|---|---|---|---|---|---|---|
| 0.0 | −9.993 | 1.4200 | 0.0 | 0.0 | 1.478E 00 | 9.290E-01 |
| −2.225 | −7.802 | 1.4280 | 4.209E 04 | 1.939E-02 | 1.436E 00 | 9.384E-01 |
| −4.451 | −5.596 | 1.4440 | 8.521E 04 | 4.085E-02 | 1.373E 00 | 9.498E-01 |
| −6.676 | −3.485 | 1.4600 | 1.296E 05 | 6.469E-02 | 1.302E 00 | 9.630E-01 |
| −8.901 | −1.480 | 1.4680 | 1.755E 05 | 9.028E-02 | 1.242E 00 | 9.779E-01 |
| −11.127 | 0.483 | 1.4760 | 2.230E 05 | 1.183E-01 | 1.179E 00 | 9.941E-01 |
| −13.352 | 2.378 | 1.4920 | 2.723E 05 | 1.509E-01 | 1.096E 00 | 1.012E 00 |
| −15.577 | 4.237 | 1.5000 | 3.236E 05 | 1.854E-01 | 1.032E 00 | 1.031E 00 |
| −17.803 | 6.057 | 1.5080 | 3.769E 05 | 2.235E-01 | 9.685E-01 | 1.050E 00 |
| −20.028 | 7.921 | 1.5080 | 4.323E 05 | 2.631E-01 | 9.276E-01 | 1.071E 00 |
| −22.253 | 9.683 | 1.5160 | 4.900E 05 | 3.097E-01 | 8.674E-01 | 1.092E 00 |

PLASMA CURRENT = 1400000.00 AMPERES

| A | B | R | PO | BETA | Q | PSI |
|---|---|---|---|---|---|---|
| 0.0 | −11.659 | 1.4200 | 0.0 | 0.0 | 1.285E 00 | 1.084E 00 |
| −2.596 | −9.102 | 1.4280 | 5.729E 04 | 2.576E-02 | 1.245E 00 | 1.095E 00 |
| −5.192 | −6.529 | 1.4440 | 1.160E 05 | 5.459E-02 | 1.188E 00 | 1.108E 00 |
| −7.789 | −4.066 | 1.4600 | 1.764E 05 | 8.700E-02 | 1.123E 00 | 1.123E 00 |
| −10.385 | −1.726 | 1.4680 | 2.388E 05 | 1.222E-01 | 1.067E 00 | 1.141E 00 |
| −12.981 | 0.563 | 1.4760 | 3.035E 05 | 1.614E-01 | 1.010E 00 | 1.160E 00 |
| −15.577 | 2.774 | 1.4920 | 3.706E 05 | 2.074E-01 | 9.345E-01 | 1.180E 00 |
| −18.174 | 4.943 | 1.5000 | 4.404E 05 | 2.570E-01 | 8.761E-01 | 1.202E 00 |
| −20.770 | 7.066 | 1.5080 | 5.130E 05 | 3.129E-01 | 8.186E-01 | 1.225E 00 |
| −23.366 | 9.242 | 1.5080 | 5.884E 05 | 3.721E-01 | 7.800E-01 | 1.249E 00 |

TABLE I-continued

| | | | | | | |
|---|---|---|---|---|---|---|
| −25.962 | 11.297 | 1.5160 | 6.669E 05 | 4.431E-01 | 7.251E-01 | 1.274E 00 |

PLASMA CURRENT = 1600000.00 AMPERES

| A | B | R | PO | BETA | Q | PSI |
|---|---|---|---|---|---|---|
| 0.0 | −13.324 | 1.4200 | 0.0 | 0.0 | 1.144E 00 | 1.239E 00 |
| −2.967 | −10.403 | 1.4280 | 7.483E 04 | 3.274E-02 | 1.105E 00 | 1.251E 00 |
| −5.934 | −7.462 | 1.4440 | 1.515E 05 | 6.984E-02 | 1.050E 00 | 1.266E 00 |
| −8.901 | −4.647 | 1.4600 | 2.304E 05 | 1.121E-01 | 9.891E-01 | 1.284E 00 |
| −11.868 | −1.973 | 1.4680 | 3.119E 05 | 1.586E-01 | 9.366E-01 | 1.304E 00 |
| −14.836 | 0.644 | 1.4760 | 3.964E 05 | 2.112E-01 | 8.827E-01 | 1.326E 00 |
| −17.803 | 3.170 | 1.4920 | 4.841E 05 | 2.740E-01 | 8.131E-01 | 1.349E 00 |
| −20.770 | 5.649 | 1.5000 | 5.753E 05 | 3.430E-01 | 7.584E-01 | 1.374E 00 |
| −23.737 | 8.076 | 1.5080 | 6.700E 05 | 4.224E-01 | 7.045E-01 | 1.400E 00 |
| −26.704 | 10.562 | 1.5080 | 7.685E 05 | 5.089E-01 | 6.670E-01 | 1.428E 00 |
| −29.671 | 12.911 | 1.5160 | 8.710E 05 | 6.151E-01 | 6.155E-01 | 1.456E 00 |

PLASMA CURRENT = 1800000.00 AMPERES

| A | B | R | PO | BETA | Q | PSI |
|---|---|---|---|---|---|---|
| 0.0 | −14.990 | 1.4200 | 0.0 | 0.0 | 1.035E 00 | 1.393E 00 |
| −3.338 | −11.703 | 1.4280 | 9.471E 04 | 4.021E-02 | 9.969E-01 | 1.408E 00 |
| −6.676 | −8.395 | 1.4440 | 1.917E 05 | 8.638E-02 | 9.446E-01 | 1.425E 00 |
| −10.014 | −5.228 | 1.4600 | 2.916E 05 | 1.397E-01 | 8.860E-01 | 1.445E 00 |
| −13.352 | −2.219 | 1.4680 | 3.948E 05 | 1.994E-01 | 8.354E-01 | 1.476E 00 |
| −16.690 | 0.724 | 1.4760 | 5.017E 05 | 2.680E-01 | 7.837E-01 | 1.491E 00 |
| −20.028 | 3.566 | 1.4920 | 6.127E 05 | 3.513E-01 | 7.180E-01 | 1.518E 00 |
| −23.366 | 6.355 | 1.5000 | 7.281E 05 | 4.451E-01 | 6.657E-01 | 1.546E 00 |
| −26.704 | 9.085 | 1.5080 | 8.480E 05 | 5.558E-01 | 6.142E-01 | 1.575E 00 |
| −30.042 | 11.882 | 1.5080 | 9.727E 05 | 6.804E-01 | 5.768E-01 | 1.606E 00 |
| −33.380 | 14.525 | 1.5160 | 1.102E 06 | 8.380E-01 | 5.273E-01 | 1.638E 00 |

PLASMA CURRENT = 2000000.00 AMPERES

| A | B | R | PO | BETA | Q | PSI |
|---|---|---|---|---|---|---|
| 0.0 | −16.655 | 1.4200 | 0.0 | 0.0 | 9.502E-01 | 1.548E 00 |
| −3.709 | −13.003 | 1.4280 | 1.169E 05 | 4.805E-02 | 9.119E-01 | 1.564E 00 |
| −7.418 | −9.327 | 1.4440 | 2.367E 05 | 1.040E-01 | 8.609E-01 | 1.583E 00 |
| −11.127 | −5.809 | 1.4600 | 3.600E 05 | 1.695E-01 | 8.042E-01 | 1.605E 00 |
| −14.836 | −2.466 | 1.4680 | 4.874E 05 | 2.442E-01 | 7.548E-01 | 1.630E 00 |
| −18.544 | 0.805 | 1.4760 | 6.194E 05 | 3.318E-01 | 7.044E-01 | 1.657E 00 |
| −22.253 | 3.963 | 1.4920 | 7.564E 05 | 4.401E-01 | 6.415E-01 | 1.686E 00 |
| −25.962 | 7.061 | 1.5000 | 8.989E 05 | 5.656E-01 | 5.906E-01 | 1.718E 00 |
| −29.671 | 10.095 | 1.5080 | 1.047E 06 | 7.181E-01 | 5.404E-01 | 1.750E 00 |
| −33.380 | 13.202 | 1.5080 | 1.201E 06 | 8.966E-01 | 5.025E-01 | 1.785E 00 |
| −37.089 | 16.139 | 1.5160 | 1.361E 06 | 1.131E 00 | 4.538E-01 | 1.820E 00 |

RECTANGULAR CROSS SECTION EQUILIBRIA
 AXIAL FIELD = 4.6000 TESLA
 MAJOR RADIUS = 1.4000 METERS
 MINOR SEMI-AXIS = 0.4000 METERS
 RATIO OF SEMI-AXES = 1.0000

PLASMA CURRENT = 1000000.00 AMPERES

| A | B | R | PO | BETA | Q | PSI |
|---|---|---|---|---|---|---|
| 0.0 | −8.328 | 1.4200 | 0.0 | 0.0 | 3.421E 00 | 7.741E-01 |
| −1.854 | −6.502 | 1.4280 | 2.923E 04 | 3.567E-03 | 3.347E 00 | 7.820E-01 |
| −3.709 | −4.664 | 1.4440 | 5.917E 04 | 7.407E-03 | 3.225E 00 | 7.915E-01 |
| −5.563 | −2.904 | 1.4600 | 8.999E 04 | 1.55E-02 | 3.080E 00 | 8.025E-01 |
| −7.418 | −1.233 | 1.4680 | 1.218E 05 | 1.587E-02 | 2.961E 00 | 8.149E-01 |
| −9.272 | 0.402 | 1.4760 | 1.548E 05 | 2.046E-02 | 2.836E 00 | 8.285E-01 |
| −11.127 | 1.981 | 1.4920 | 1.891E 05 | 2.563E-02 | 2.658E 00 | 8.432E-01 |
| −12.981 | 3.531 | 1.5000 | 2.247E 05 | 3.090E-02 | 2.527E 00 | 8.588E-01 |
| −14.836 | 5.047 | 1.5080 | 2.617E 05 | 3.652E-02 | 2.396E 00 | 8.752E-01 |
| −16.690 | 6.601 | 1.5080 | 3.002E 05 | 4.206E-02 | 2.320E 00 | 8.924E-01 |
| −18.544 | 8.069 | 1.5160 | 3.402E 05 | 4.838E-02 | 2.195E 00 | 9.102E-01 |

PLASMA CURRENT = 2000000.00 AMPERES

| A | B | R | PO | BETA | Q | PSI |
|---|---|---|---|---|---|---|
| 0.0 | −16.655 | 1.4200 | 0.0 | 0.0 | 1.750E 00 | 1.548E 00 |
| −3.709 | −13.003 | 1.4280 | 1.169E 05 | 1.375E-02 | 1.705E 00 | 1.564E 00 |
| −7.418 | −9.327 | 1.4440 | 2.367E 05 | 2.882E-02 | 1.635E 00 | 1.583E 00 |
| −11.127 | −5.809 | 1.4600 | 3.600E 05 | 4.540E-02 | 1.554E 00 | 1.605E 00 |
| −14.836 | −2.466 | 1.4680 | 4.874E 05 | 6.298E-02 | 1.486E 00 | 1.630E 00 |
| −18.544 | 0.805 | 1.4760 | 6.194E 05 | 8.206E-02 | 1.416E 00 | 1.657E 00 |
| −22.253 | 3.963 | 1.4920 | 7.564E 05 | 1.039E-01 | 1.320E 00 | 1.686E 00 |
| −25.962 | 7.061 | 1.5000 | 8.989E 05 | 1.268E-01 | 1.247E 00 | 1.718E 00 |
| −29.671 | 10.095 | 1.5080 | 1.047E 06 | 1.517E-01 | 1.176E 00 | 1.750E 00 |
| −33.380 | 13.202 | 1.5080 | 1.201E 06 | 1.771E-01 | 1.131E 00 | 1.785E 00 |
| −37.089 | 16.139 | 1.1560 | 1.361E 06 | 2.066E-01 | 1.062E 00 | 1.820E 00 |

PLASMA CURRENT = 3000000.00 AMPERES

| A | B | R | PO | BETA | Q | PSI |
|---|---|---|---|---|---|---|
| 0.0 | −24.983 | 1.4200 | 0.0 | 0.0 | 1.210E 00 | 2.322E 00 |
| −5.563 | −19.505 | 1.4280 | 2.631E 05 | 2.918E-02 | 1.170E 00 | 2.346E 00 |
| −11.127 | −13.991 | 1.4440 | 5.326E 05 | 6.204E-02 | 1.115E 00 | 2.375E 00 |
| −16.690 | −8.713 | 1.4600 | 8.099E 05 | 9.920E-02 | 1.051E 00 | 2.407E 00 |
| −22.253 | −3.699 | 1.4680 | 1.097E 06 | 1.399E-01 | 9.974E-01 | 2.445E 00 |
| −27.817 | 1.207 | 1.4760 | 1.394E 06 | 1.855E-01 | 9.421E-01 | 2.485E 00 |
| −33.380 | 5.944 | 1.4920 | 1.702E 06 | 2.394E-01 | 8.698E-01 | 2.529E 00 |
| −38.943 | 10.592 | 1.5000 | 2.022E 06 | 2.981E-01 | 8.135E-01 | 2.576E 00 |
| −44.507 | 15.142 | 1.5080 | 2.356E 06 | 3.649E-01 | 7.580E-01 | 2.626E 00 |
| −50.070 | 19.804 | 1.5080 | 2.702E 06 | 4.366E-01 | 7.201E-01 | 2.677E 00 |
| −55.633 | 24.208 | 1.5160 | 3.062E 06 | 5.236E-01 | 6.671E-01 | 2.731E 00 |

TABLE I-continued

PLASMA CURRENT = 4000000.00 AMPERES

| A | B | R | PO | BETA | Q | PSI |
|---|---|---|---|---|---|---|
| 0.0 | −33.311 | 1.4200 | 0.0 | 0.0 | 9.502E-01 | 3.097E 00 |
| −7.418 | −26.007 | 1.4280 | 4.677E 05 | 4.805E-02 | 9.119E-01 | 3.128E 00 |
| −14.836 | −18.655 | 1.4440 | 9.468E 05 | 1.040E-01 | 8.609E-01 | 3.166E 00 |
| −22.253 | −11.617 | 1.4600 | 1.440E 06 | 1.695E-01 | 8.042E-01 | 3.210E 00 |
| −29.671 | −4.932 | 1.4680 | 1.950E 06 | 2.442E-01 | 7.548E-01 | 3.260E 00 |
| −37.089 | 1.610 | 1.4760 | 2.477E 06 | 3.318E-01 | 7.044E-01 | 3.314E 00 |
| −44.507 | 7.925 | 1.4920 | 3.026E 06 | 4.401E-01 | 6.415E-01 | 3.373E 00 |
| −51.925 | 14.123 | 1.5000 | 3.595E 06 | 5.656E-01 | 5.906E-01 | 3.435E 00 |
| −59.342 | 20.189 | 1.5080 | 4.188E 06 | 7.181E-01 | 5.404E-01 | 3.501E 00 |
| −66.760 | 26.405 | 1.5080 | 4.803E 06 | 8.966E-01 | 5.025E-01 | 3.569E 00 |
| −74.178 | 32.277 | 1.5160 | 5.444E 06 | 1.131E 00 | 4.538E-01 | 3.641E 00 |

PLASMA CURRENT = 5000000.00 AMPERES

| A | B | R | PO | BETA | Q | PSI |
|---|---|---|---|---|---|---|
| 0.0 | −41.638 | 1.4200 | 0.0 | 0.0 | 8.023E-01 | 3.871E 00 |
| −9.272 | −32.509 | 1.4280 | 7.308E 05 | 6.859E-02 | 7.633E-01 | 3.910E 00 |
| −18.544 | −23.319 | 1.4440 | 1.479E 06 | 1.513E-01 | 7.136E-01 | 3.958E 00 |
| −27.817 | −14.521 | 1.4600 | 2.250E 06 | 2.523E-01 | 6.592E-01 | 4.013E 00 |
| −37.089 | −6.165 | 1.4680 | 3.046E 06 | 3.731E-01 | 6.107E-01 | 4.075E 00 |
| −46.361 | 2.012 | 1.4760 | 3.871E 06 | 5.226E-01 | 5.612E-01 | 4.142E 00 |
| −55.633 | 9.906 | 1.4920 | 4.728E 06 | 7.194E-01 | 5.017E-01 | 4.216E 00 |
| −64.906 | 17.654 | 1.5000 | 5.618E 06 | 9.675E-01 | 4.515E-01 | 4.294E 00 |
| −74.178 | 25.237 | 1.5080 | 6.543E 06 | 1.301E 00 | 4.015E-01 | 4.376E 00 |

PLASMA CURRENT = 6000000.00 AMPERES

| A | B | R | PO | BETA | Q | PSI |
|---|---|---|---|---|---|---|
| 0.0 | −49.966 | 1.4200 | 0.0 | 0.0 | 7.092E-01 | 4.645E 00 |
| −11.127 | −39.010 | 1.4280 | 1.052E 06 | 8.931E-02 | 6.689E-01 | 4.692E 00 |
| −22.253 | −27.982 | 1.4440 | 2.130E 06 | 2.011E-01 | 6.190E-01 | 4.749E 00 |
| −33.380 | −17.426 | 1.4600 | 3.240E 06 | 3.434E-01 | 5.650E-01 | 4.815E 00 |
| −44.507 | −7.398 | 1.4680 | 4.386E 06 | 5.230E-01 | 5.158E-01 | 4.889E 00 |
| −55.633 | 2.414 | 1.4760 | 5.574E 06 | 7.602E-01 | 4.653E-01 | 4.971E 00 |
| −66.760 | 11.888 | 1.4920 | 6.808E 06 | 1.098E 00 | 4.062E-01 | 5.059E 00 |

PLASMA CURRENT = 7000000.00 AMPERES

| A | B | R | PO | BETA | Q | PSI |
|---|---|---|---|---|---|---|
| 0.0 | −58.294 | 1.4200 | 0.0 | 0.0 | 6.466E-01 | 5.419E 00 |
| −12.981 | −45.512 | 1.4280 | 1.432E 06 | 1.092E-01 | 6.049E-01 | 5.474E 00 |
| −25.962 | −32.646 | 1.4440 | 2.900E 06 | 2.508E-01 | 5.543E-01 | 5.541E 00 |
| −38.943 | −20.330 | 1.4600 | 4.410E 06 | 4.390E-01 | 4.997E-01 | 5.617E 00 |
| −51.925 | −8.631 | 1.4680 | 5.970E 06 | 6.902E-01 | 4.490E-01 | 5.704E 00 |
| −64.906 | 2.817 | 1.4760 | 7.587E 06 | 1.047E 00 | 3.965E-01 | 5.799E 00 |

PLASMA CURRENT = 8000000.00 AMPERES

| A | B | R | PO | BETA | Q | PSI |
|---|---|---|---|---|---|---|
| 0.0 | −66.621 | 1.4200 | 0.0 | 0.0 | 6.024E-01 | 6.193E 00 |
| −14.836 | −52.014 | 1.4280 | 1.871E 06 | 1.277E-01 | 5.594E-01 | 6.256E 00 |
| −29.671 | −37.310 | 1.4440 | 3.787E 06 | 2.988E-01 | 5.079E-01 | 6.332E 00 |
| −44.507 | −23.234 | 1.4600 | 5.760E 06 | 5.358E-01 | 4.523E-01 | 6.420E 00 |
| −59.342 | −9.864 | 1.4680 | 7.798E 06 | 8.709E-01 | 3.997E-01 | 6.519E 00 |
| −74.178 | 3.219 | 1.4760 | 9.910E 06 | 1.387E 00 | 3.445E-01 | 6.628E 00 |

PLASMA CURRENT = 9000000.00 AMPERES

| A | B | R | PO | BETA | Q | PSI |
|---|---|---|---|---|---|---|
| 0.0 | −74.949 | 1.4200 | 0.0 | 0.0 | 5.702E-01 | 6.967E 00 |
| −16.690 | −58.515 | 1.4280 | 2.368E 06 | 1.444E-01 | 5.260E-01 | 7.038E 00 |
| −33.380 | −41.973 | 1.4440 | 4.793E 06 | 3.438E-01 | 4.734E-01 | 7.124E 00 |
| −50.070 | −26.138 | 1.4600 | 7.289E 06 | 6.313E-01 | 4.168E-01 | 7.222E 00 |
| −66.760 | −11.096 | 1.4680 | 9.870E 06 | 1.061E 00 | 3.621E-01 | 7.334E 00 |

PLASMA CURRENT = 10000000.00 AMPERES

| A | B | R | PO | BETA | Q | PSI |
|---|---|---|---|---|---|---|
| 0.0 | −83.277 | 1.4200 | 0.0 | 0.0 | 5.460E-01 | 7.741E 00 |
| −18.544 | −65.017 | 1.4280 | 2.923E 06 | 1.594E-01 | 5.007E-01 | 7.820E 00 |
| −37.089 | −46.637 | 1.4440 | 5.917E 06 | 3.854E-01 | 4.472E-01 | 7.915E 00 |
| −55.633 | −29.043 | 1.4600 | 8.999E 06 | 7.234E-01 | 3.893E-01 | 8.025E 00 |
| −74.178 | −12.329 | 1.4680 | 1.218E 07 | 1.258E 00 | 3.325E-01 | 8.149E 00 |

RECTANGULAR CROSS SECTION EQUILIBRIA
 AXIAL FIELD = 4.6000 TESLA
 MAJOR RADIUS = 1.4000 METERS
 MINOR SEMI-AXIS = 0.4000 METERS
 RATIO OF SEMI-AXES = 1.5000

PLASMA CURRENT = 1000000.00 AMPERES

| A | B | R | PO | BETA | Q | PSI |
|---|---|---|---|---|---|---|
| 0.0 | −5.552 | 1.4200 | 0.0 | 0.0 | 5.541E 00 | 6.750E-01 |
| −1.236 | −4.334 | 1.4280 | 1.698E 04 | 2.083E-03 | 5.425E 00 | 6.815E-01 |
| −2.473 | −3.144 | 1.4360 | 3.433E 04 | 4.266E-03 | 5.286E 00 | 6.887E-01 |
| −3.709 | −1.979 | 1.4440 | 5.208E 04 | 6.557E-03 | 5.128E 00 | 6.966E-01 |
| −4.945 | −0.840 | 1.4520 | 7.029E 04 | 8.966E-03 | 4.954E 00 | 7.051E-01 |
| −6.181 | 0.274 | 1.4600 | 8.899E 04 | 1.150E-02 | 4.768E 00 | 7.142E-01 |
| −7.418 | 1.364 | 1.4680 | 1.082E 05 | 1.417E-02 | 4.572E 00 | 7.238E-01 |
| −8.654 | 2.431 | 1.4760 | 1.280E 05 | 1.698E-02 | 4.371E 00 | 7.338E-01 |
| −9.890 | 3.475 | 1.4840 | 1.484E 05 | 1.994E-02 | 4.167E 00 | 7.443E-01 |
| −11.127 | 4.544 | 1.4840 | 1.694E 05 | 2.281E-02 | 4.057E 00 | 7.552E-01 |
| −12.363 | 5.554 | 1.4920 | 1.910E 05 | 2.607E-02 | 3.855E 00 | 7.665E-01 |

TABLE I-continued

PLASMA CURRENT = 2000000.00 AMPERES

| A | B | R | PO | BETA | Q | PSI |
|---|---|---|---|---|---|---|
| 0.0 | −11.104 | 1.4200 | 0.0 | 0.0 | 2.808E 00 | 1.350E 00 |
| −2.473 | −8.669 | 1.4280 | 6.793E 04 | 8.154E-03 | 2.742E 00 | 1.363E 00 |
| −4.945 | −6.288 | 1.4360 | 1.373E 05 | 1.679E-02 | 2.665E 00 | 1.377E 00 |
| −7.418 | −3.959 | 1.4440 | 2.083E 05 | 2.596E-02 | 2.578E 00 | 1.393E 00 |
| −9.890 | −1.680 | 1.4520 | 2.811E 05 | 3.570E-02 | 2.483E 00 | 1.410E 00 |
| −12.363 | 0.548 | 1.4600 | 3.560E 05 | 4.607E-02 | 2.382E 00 | 1.428E 00 |
| −14.836 | 2.729 | 1.4680 | 4.329E 05 | 5.712E-02 | 2.277E 00 | 1.448E 00 |
| −17.308 | 4.862 | 1.4760 | 5.121E 05 | 6.891E-02 | 2.170E 00 | 1.468E 00 |
| −19.781 | 6.949 | 1.4840 | 5.935E 05 | 8.148E-02 | 2.061E 00 | 1.489E 00 |
| −22.253 | 9.089 | 1.4840 | 6.775E 05 | 9.388E-02 | 2.000E 00 | 1.510E 00 |
| −24.726 | 11.108 | 1.4920 | 7.641E 05 | 1.081E-01 | 1.893E 00 | 1.533E 00 |

PLASMA CURRENT = 3000000.00 AMPERES

| A | B | R | PO | BETA | Q | PSI |
|---|---|---|---|---|---|---|
| 0.0 | −16.655 | 1.4200 | 0.0 | 0.0 | 1.913E 00 | 2.025E 00 |
| −3.709 | −13.003 | 1.4280 | 1.529E 05 | 1.771E-02 | 1.860E 00 | 2.045E 00 |
| −7.418 | −9.412 | 1.4360 | 3.089E 05 | 3.680E-02 | 1.800E 00 | 2.066E 00 |
| −11.127 | −5.938 | 1.4440 | 4.687E 05 | 5.741E-02 | 1.733E 00 | 2.090E 00 |
| −14.836 | −2.521 | 1.4520 | 6.326E 05 | 7.972E-02 | 1.661E 00 | 2.115E 00 |
| −18.544 | 0.823 | 1.4600 | 8.009E 05 | 1.039E-01 | 1.586E 00 | 2.143E 00 |
| −22.253 | 4.093 | 1.4680 | 9.740E 05 | 1.302E-01 | 1.508E 00 | 2.171E 00 |
| −25.962 | 7.293 | 1.4760 | 1.152E 06 | 1.589E-01 | 1.429E 00 | 2.202E 00 |
| −29.671 | 10.424 | 1.4840 | 1.335E 06 | 1.901E-01 | 1.350E 00 | 2.233E 00 |
| −33.380 | 13.633 | 1.4840 | 1.524E 06 | 2.219E-01 | 1.301E 00 | 2.266E 00 |
| −37.089 | 16.662 | 1.4920 | 1.719E 06 | 2.589E-01 | 1.223E 00 | 2.299E 00 |

PLASMA CURRENT = 4000000.00 AMPERES

| A | B | R | PO | BETA | Q | PSI |
|---|---|---|---|---|---|---|
| 0.0 | −22.207 | 1.4200 | 0.0 | 0.0 | 1.477E 00 | 2.700E 00 |
| −4.945 | −17.338 | 1.4280 | 2.717E 05 | 3.004E-02 | 1.429E 00 | 2.726E 00 |
| −9.890 | −12.576 | 1.4360 | 5.492E 05 | 6.312E-02 | 1.374E 00 | 2.755E 00 |
| −14.836 | −7.917 | 1.4440 | 8.333E 05 | 9.968E-02 | 1.315E 00 | 2.786E 00 |
| −19.781 | −3.361 | 1.4520 | 1.125E 06 | 1.402E-01 | 1.253E 00 | 2.820E 00 |
| −24.726 | 1.097 | 1.4600 | 1.424E 06 | 1.854E-01 | 1.187E 00 | 2.857E 00 |
| −29.671 | 5.458 | 1.4680 | 1.732E 06 | 2.359E-01 | 1.121E 00 | 2.895E 00 |
| −34.616 | 9.724 | 1.4760 | 2.048E 06 | 2.926E-01 | 1.053E 00 | 2.935E 00 |
| −39.562 | 13.898 | 1.4840 | 2.374E 06 | 3.565E-01 | 9.855E-01 | 2.977E 00 |
| −44.507 | 18.177 | 1.4840 | 2.710E 06 | 4.243E-01 | 9.407E-01 | 3.021E 00 |
| −49.452 | 22.216 | 1.4920 | 3.056E 06 | 5.060E-01 | 8.749E-01 | 3.066E 00 |

PLASMA CURRENT = 5000000.00 AMPERES

| A | B | R | PO | BETA | Q | PSI |
|---|---|---|---|---|---|---|
| 0.0 | −27.759 | 1.4200 | 0.0 | 0.0 | 1.224E 00 | 3.375E 00 |
| −6.181 | −21.672 | 1.4280 | 4.246E 05 | 4.431E-02 | 1.176E 00 | 3.408E 00 |
| −12.363 | −15.719 | 1.4360 | 8.582E 05 | 9.437E-02 | 1.124E 00 | 3.444E 00 |
| −18.544 | −9.897 | 1.4440 | 1.302E 06 | 1.512E-01 | 1.068E 00 | 3.483E 00 |
| −24.726 | −4.201 | 1.4520 | 1.757E 06 | 2.162E-01 | 1.009E 00 | 3.526E 00 |
| −30.907 | 1.371 | 1.4600 | 2.225E 06 | 2.911E-01 | 9.477E-01 | 3.571E 00 |
| −37.089 | 6.822 | 1.4680 | 2.706E 06 | 3.779E-01 | 8.854E-01 | 3.619E 00 |
| −43.270 | 12.155 | 1.4760 | 3.200E 06 | 4.794E-01 | 8.227E-01 | 3.669E 00 |
| −49.452 | 17.373 | 1.4840 | 3.710E 06 | 5.993E-01 | 7.601E-01 | 3.722E 00 |
| −55.633 | 22.722 | 1.4840 | 4.234E 06 | 7.346E-01 | 7.149E-01 | 3.776E 00 |
| −61.815 | 27.770 | 1.4920 | 4.775E 06 | 9.065E-01 | 6.537E-01 | 3.832E 00 |

PLASMA CURRENT = 6000000.00 AMPERES

| A | B | R | PO | BETA | Q | PSI |
|---|---|---|---|---|---|---|
| 0.0 | −33.311 | 1.4200 | 0.0 | 0.0 | 1.061E 00 | 4.050E 00 |
| −7.418 | −26.007 | 1.4280 | 6.114E 05 | 5.973E-02 | 1.013E 00 | 4.089E 00 |
| −14.836 | −18.863 | 1.4360 | 1.236E 06 | 1.291E-01 | 9.610E-01 | 4.132E 00 |
| −22.253 | −11.876 | 1.4440 | 1.875E 06 | 2.103E-01 | 9.055E-01 | 4.180E 00 |
| −29.671 | −5.041 | 1.4520 | 2.530E 06 | 3.064E-01 | 8.475E-01 | 4.231E 00 |
| −37.089 | 1.645 | 1.4600 | 3.204E 06 | 4.215E-01 | 7.875E-01 | 4.285E 00 |
| −44.507 | 8.186 | 1.4680 | 3.896E 06 | 5.613E-01 | 7.265E-01 | 4.343E 00 |
| −51.925 | 14.586 | 1.4760 | 4.608E 06 | 7.338E-01 | 6.649E-01 | 4.403E 00 |
| −59.342 | 20.848 | 1.4840 | 5.342E 06 | 9.511E-01 | 6.034E-01 | 4.466E 00 |
| −66.760 | 27.266 | 1.4840 | 6.098E 06 | 1.219E 00 | 5.551E-01 | 4.531E 00 |

PLASMA CURRENT = 7000000.00 AMPERES

| A | B | R | PO | BETA | Q | PSI |
|---|---|---|---|---|---|---|
| 0.0 | −38.862 | 1.4200 | 0.0 | 0.0 | 9.495E-01 | 4.725E 00 |
| −8.654 | −30.341 | 1.4280 | 8.322E 05 | 7.558E-02 | 9.006E-01 | 4.771E 00 |
| −17.308 | −22.007 | 1.4360 | 1.682E 06 | 1.659E-01 | 8.478E-01 | 4.821E 00 |
| −25.962 | −13.855 | 1.4440 | 2.552E 06 | 2.751E-01 | 7.918E-01 | 4.876E 00 |
| −34.616 | −5.881 | 1.4520 | 3.444E 06 | 4.094E-01 | 7.332E-01 | 4.936E 00 |
| −43.270 | 1.919 | 1.4600 | 4.360E 06 | 5.777E-01 | 6.727E-01 | 4.999E 00 |
| −51.925 | 9.551 | 1.4680 | 5.303E 06 | 7.936E-01 | 6.110E-01 | 5.066E 00 |
| −60.579 | 17.017 | 1.4760 | 6.273E 06 | 1.079E 00 | 5.483E-01 | 5.137E 00 |

PLASMA CURRENT = 8000000.00 AMPERES

| A | B | R | PO | BETA | Q | PSI |
|---|---|---|---|---|---|---|
| 0.0 | −44.414 | 1.4200 | 0.0 | 0.0 | 8.695E-01 | 5.400E 00 |
| −9.890 | −34.676 | 1.4280 | 1.087E 06 | 9.131E-02 | 8.194E-01 | 5.452E 00 |
| −19.781 | −25.151 | 1.4360 | 2.197E 06 | 2.035E-01 | 7.654E-01 | 5.510E 00 |
| −29.671 | −15.835 | 1.4440 | 3.333E 06 | 3.439E-01 | 7.082E-01 | 5.573E 00 |
| −39.562 | −6.721 | 1.4520 | 4.498E 06 | 5.236E-01 | 6.483E-01 | 5.641E 00 |
| −49.452 | 2.194 | 1.4600 | 5.695E 06 | 7.605E-01 | 5.863E-01 | 5.713E 00 |
| −59.342 | 10.915 | 1.4680 | 6.926E 06 | 1.085E 00 | 5.225E-01 | 5.790E 00 |

PLASMA CURRENT = 9000000.00 AMPERES

TABLE I-continued

| A | B | R | PO | BETA | Q | PSI |
|---|---|---|---|---|---|---|
| 0.0 | −49.966 | 1.4200 | 0.0 | 0.0 | 8.102E-01 | 6.075E 00 |
| −11.127 | −39.010 | 1.4280 | 1.376E 06 | 1.065E-01 | 7.587E-01 | 6.134E 00 |
| −22.253 | −28.295 | 1.4360 | 2.780E 06 | 2.410E-01 | 7.033E-01 | 6.199E 00 |
| −33.380 | −17.814 | 1.4440 | 4.218E 06 | 4.150E-01 | 6.447E-01 | 6.269E 00 |
| −44.507 | −7.562 | 1.4520 | 5.693E 06 | 6.473E-01 | 5.831E-01 | 6.346E 00 |
| −55.633 | 2.468 | 1.4600 | 7.208E 06 | 9.712E-01 | 5.188E-01 | 6.428E 00 |
| −66.760 | 12.279 | 1.4680 | 8.766E 06 | 1.450E 00 | 4.520E-01 | 6.514E 00 |

PLASMA CURRENT = 10000000.00 AMPERES

| A | B | R | PO | BETA | Q | PSI |
|---|---|---|---|---|---|---|
| 0.0 | −55.518 | 1.4200 | 0.0 | 0.0 | 7.648E-01 | 6.750E 00 |
| −12.363 | −43.345 | 1.4280 | 1.698E 06 | 1.209E-01 | 7.121E-01 | 6.815E 00 |
| −24.726 | −31.439 | 1.4360 | 3.433E 06 | 2.776E-01 | 6.554E-01 | 6.887E 00 |
| −37.089 | −19.793 | 1.4440 | 5.208E 06 | 4.870E-01 | 5.951E-01 | 6.996E 00 |
| −49.452 | −8.402 | 1.4520 | 7.029E 06 | 7.791E-01 | 5.315E-01 | 7.051E 00 |
| −61.815 | 2.742 | 1.4600 | 8.899E 06 | 1.211E 00 | 4.646E-01 | 7.142E 00 |

RECTANGULAR CROSS SECTION EQUILIBRIA
AXIAL FIELD = 4.6000 TESLA
MAJOR RADIUS = 1.4000 METERS
MINOR SEMI-AXIS = 0.4000 METERS
RATIO OF SEMI-AXES = 2.0000

PLASMA CURRENT = 1000000.00 AMPERES

| A | B | R | PO | BETA | Q | PSI |
|---|---|---|---|---|---|---|
| 0.0 | −4.164 | 1.4200 | 0.0 | 0.0 | 8.508E 00 | 5.272E-01 |
| −0.927 | −3.251 | 1.4280 | 9.951E 03 | 1.224E-03 | 8.333E 00 | 5.324E-01 |
| −1.854 | −2.358 | 1.4360 | 2.011E 04 | 2.505E-03 | 8.123E 00 | 5.380E-01 |
| −2.782 | −1.484 | 1.4440 | 3.049E 04 | 3.844E-03 | 7.884E 00 | 5.437E-01 |
| −3.709 | −0.637 | 1.4440 | 4.110E 04 | 5.189E-03 | 7.735E 00 | 5.498E-01 |
| −4.636 | 0.208 | 1.4520 | 5.197E 04 | 6.641E-03 | 7.462E 00 | 5.561E-01 |
| −5.563 | 1.035 | 1.4600 | 6.309E 04 | 8.162E-03 | 7.172E 00 | 5.626E-01 |
| −6.491 | 1.863 | 1.4600 | 7.449E 04 | 9.648E-03 | 7.016E 00 | 5.693E-01 |
| −7.418 | 2.663 | 1.4680 | 8.617E 04 | 1.130E-02 | 6.712E 00 | 5.763E-01 |
| −8.345 | 3.483 | 1.4680 | 9.813E 04 | 1.288E-02 | 6.560E 00 | 5.834E-01 |
| −9.272 | 4.256 | 1.4760 | 1.104E 05 | 1.467E-02 | 6.251E 00 | 5.907E-01 |

PLASMA CURRENT = 2000000.00 AMPERES

| A | B | R | PO | BETA | Q | PSI |
|---|---|---|---|---|---|---|
| 0.0 | −8.328 | 1.4200 | 0.0 | 0.0 | 4.288E 00 | 1.054E 00 |
| −1.854 | −6.502 | 1.4280 | 3.980E 04 | 4.835E-03 | 4.193E 00 | 1.065E 00 |
| −3.709 | −4.716 | 1.4360 | 8.044E 04 | 9.924E-03 | 4.081E 00 | 1.076E 00 |
| −5.563 | −2.969 | 1.4440 | 1.219E 05 | 1.528E-02 | 3.954E 00 | 1.087E 00 |
| −7.418 | −1.274 | 1.4440 | 1.644E 05 | 2.070E-02 | 3.872E 00 | 1.100E 00 |
| −9.272 | 0.416 | 1.4520 | 2.079E 05 | 2.659E-02 | 3.729E 00 | 1.112E 00 |
| −11.127 | 2.069 | 1.4600 | 2.524E 05 | 3.280E-02 | 3.578E 00 | 1.125E 00 |
| −12.981 | 3.727 | 1.4600 | 2.980E 05 | 3.892E-02 | 3.493E 00 | 1.139E 00 |
| −14.836 | 5.326 | 1.4680 | 3.447E 05 | 4.575E-02 | 3.336E 00 | 1.153E 00 |
| −16.690 | 6.966 | 1.4680 | 3.925E 05 | 5.238E-02 | 3.253E 00 | 1.167E 00 |
| −18.544 | 8.513 | 1.4760 | 4.416E 05 | 5.990E-02 | 3.094E 00 | 1.181E 00 |

PLASMA CURRENT = 3000000.00 AMPERES

| A | B | R | PO | BETA | Q | PSI |
|---|---|---|---|---|---|---|
| 0.0 | −12.491 | 1.4200 | 0.0 | 0.0 | 2.896E 00 | 1.581E 00 |
| −2.782 | −9.753 | 1.4280 | 8.956E 04 | 1.065E-02 | 2.825E 00 | 1.597E 00 |
| −5.563 | −7.074 | 1.4360 | 1.810E 05 | 2.198E-02 | 2.742E 00 | 1.614E 00 |
| −8.345 | −4.453 | 1.4440 | 2.744E 05 | 3.404E-02 | 2.649E 00 | 1.631E 00 |
| −11.127 | −1.911 | 1.4440 | 3.699E 05 | 4.637E-02 | 2.587E 00 | 1.649E 00 |
| −13.908 | 0.624 | 1.4520 | 4.677E 05 | 5.991E-02 | 2.484E 00 | 1.668E 00 |
| −16.690 | 3.104 | 1.4600 | 5.678E 05 | 7.436E-02 | 2.376E 00 | 1.688E 00 |
| −19.472 | 5.590 | 1.4600 | 6.704E 05 | 8.880E-02 | 2.312E 00 | 1.708E 00 |
| −22.253 | 7.989 | 1.4680 | 7.755E 05 | 1.051E-01 | 2.201E 00 | 1.729E 00 |
| −25.035 | 10.449 | 1.4680 | 8.832E 05 | 1.212E-01 | 2.139E 00 | 1.750E 00 |
| −27.817 | 12.769 | 1.4760 | 9.936E 05 | 1.396E-01 | 2.027E 00 | 1.772E 00 |

PLASMA CURRENT = 4000000.00 AMPERES

| A | B | R | PO | BETA | Q | PSI |
|---|---|---|---|---|---|---|
| 0.0 | −16.655 | 1.4200 | 0.0 | 0.0 | 2.211E 00 | 2.109E 00 |
| −3.709 | −13.003 | 1.4280 | 1.592E 05 | 1.840E-02 | 2.149E 00 | 2.130E 00 |
| −7.418 | −9.432 | 1.4360 | 3.217E 05 | 3.825E-02 | 2.079E 00 | 2.152E 00 |
| −11.127 | −5.938 | 1.4440 | 4.878E 05 | 5.967E-02 | 2.001E 00 | 2.175E 00 |
| −14.836 | −2.549 | 1.4440 | 6.576E 05 | 8.192E-02 | 1.947E 00 | 2.199E 00 |
| −18.544 | 0.832 | 1.4520 | 8.315E 05 | 1.067E-01 | 1.861E 00 | 2.224E 00 |
| −22.253 | 4.138 | 1.4600 | 1.009E 06 | 1.336E-01 | 1.773E 00 | 2.250E 00 |
| −25.962 | 7.454 | 1.4600 | 1.192E 06 | 1.611E-01 | 1.717E 00 | 2.277E 00 |
| −29.671 | 10.652 | 1.4680 | 1.379E 06 | 1.925E-01 | 1.626E 00 | 2.305E 00 |
| −33.380 | 13.932 | 1.4680 | 1.570E 06 | 2.242E-01 | 1.572E 00 | 2.334E 00 |
| −37.089 | 17.025 | 1.4760 | 1.766E 06 | 2.612E-01 | 1.482E 00 | 2.363E 00 |

PLASMA CURRENT = 5000000.00 AMPERES

| A | B | R | PO | BETA | Q | PSI |
|---|---|---|---|---|---|---|
| 0.0 | −20.819 | 1.4200 | 0.0 | 0.0 | 1.808E 00 | 2.636E 00 |
| −4.636 | −16.254 | 1.4280 | 2.488E 05 | 2.775E-02 | 1.750E 00 | 2.662E 00 |
| −9.272 | −11.790 | 1.4360 | 5.027E 05 | 5.817E-02 | 1.686E 00 | 2.690E 00 |
| −13.908 | −7.422 | 1.4440 | 7.622E 05 | 9.159E-02 | 1.615E 00 | 2.719E 00 |
| −18.544 | −3.186 | 1.4440 | 1.028E 06 | 1.270E-01 | 1.563E 00 | 2.749E 00 |
| −23.181 | 1.040 | 1.4520 | 1.299E 06 | 1.672E-01 | 1.487E 00 | 2.781E 00 |
| −27.817 | 5.173 | 1.4600 | 1.577E 06 | 2.118E-01 | 1.408E 00 | 2.813E 00 |
| −32.453 | 9.317 | 1.4600 | 1.862E 06 | 2.584E-01 | 1.356E 00 | 2.847E 00 |
| −37.089 | 13.315 | 1.4680 | 2.154E 06 | 3.129E-01 | 1.275E 00 | 2.881E 00 |

TABLE I-continued

| | | | | | | |
|---|---|---|---|---|---|---|
| −41.725 | 17.415 | 1.4680 | 2.453E 06 | 3.698E-01 | 1.224E 00 | 2.917E 00 |
| −46.361 | 21.281 | 1.4760 | 2.760E 06 | 4.376E-01 | 1.145E 00 | 2.953E 00 |

PLASMA CURRENT = 6000000.00 AMPERES

| A | B | R | PO | BETA | Q | PSI |
|---|---|---|---|---|---|---|
| 0.0 | −24.983 | 1.4200 | 0.0 | 0.0 | 1.546E 00 | 3.163E 00 |
| −5.563 | −19.505 | 1.4280 | 3.582E 05 | 3.832E-02 | 1.490E 00 | 3.195E 00 |
| −11.127 | −14.147 | 1.4360 | 7.239E 05 | 8.113E-02 | 1.427E 00 | 3.228E 00 |
| −16.690 | −8.907 | 1.4440 | 1.098E 06 | 1.291E-01 | 1.360E 00 | 3.262E 00 |
| −16.690 | −8.907 | 1.4440 | 1.098E 06 | 1.291E-01 | 1.360E 00 | 3.262E 00 |
| −22.253 | −3.823 | 1.4440 | 1.480E 06 | 1.811E-01 | 1.309E 00 | 3.299E 00 |
| −27.817 | 1.247 | 1.4520 | 1.871E 06 | 2.416E-01 | 1.237E 00 | 3.337E 00 |
| −33.380 | 6.207 | 1.4600 | 2.271E 06 | 3.103E-01 | 1.163E 00 | 3.376E 00 |
| −38.943 | 11.181 | 1.4600 | 2.682E 06 | 3.846E-01 | 1.111E 00 | 3.416E 00 |
| −44.507 | 15.978 | 1.4680 | 3.102E 06 | 4.740E-01 | 1.036E 00 | 3.458E 00 |
| −50.070 | 20.898 | 1.4680 | 3.553E 06 | 5.713E-01 | 9.850E-01 | 3.500E 00 |
| −55.633 | 25.538 | 1.4760 | 3.975E 06 | 6.912E-01 | 9.108E-01 | 3.544E 00 |

PLASMA CURRENT = 7000000.00 AMPERES

| A | B | R | PO | BETA | Q | PSI |
|---|---|---|---|---|---|---|
| 0.0 | −29.147 | 1.4200 | 0.0 | 0.0 | 1.363E 00 | 3.690E 00 |
| −6.491 | −22.756 | 1.4280 | 4.876E 05 | 4.974E-02 | 1.307E 00 | 3.727E 00 |
| −12.981 | −16.505 | 1.4360 | 9.853E 05 | 1.065E-01 | 1.246E 00 | 3.766E 00 |
| −19.472 | −10.391 | 1.4440 | 1.494E 06 | 1.715E-01 | 1.810E 00 | 3.806E 00 |
| −25.962 | −4.460 | 1.4440 | 2.014E 06 | 2.438E-01 | 1.128E 00 | 3.848E 00 |
| −32.453 | 1.455 | 1.4520 | 2.546E 06 | 3.301E-01 | 1.058E 00 | 3.893E 00 |
| −38.943 | 7.242 | 1.4600 | 3.091E 06 | 4.313E-01 | 9.866E-01 | 3.938E 00 |
| −45.434 | 13.044 | 1.4600 | 3.650E 06 | 5.453E-01 | 9.332E-01 | 3.985E 00 |
| −51.925 | 1.641 | 1.4680 | 4.222E 06 | 6.874E-01 | 8.605E-01 | 4.034E 00 |
| −58.415 | 24.381 | 1.4680 | 4.809E 06 | 8.509E-01 | 8.071E-01 | 4.084E 00 |
| −64.906 | 29.794 | 1.4760 | 5.410E 06 | 1.062E 00 | 7.346E-01 | 4.135E 00 |

PLASMA CURRENT = 8000000.00 AMPERES

| A | B | R | PO | BETA | Q | PSI |
|---|---|---|---|---|---|---|
| 0.0 | −33.311 | 1.4200 | 0.0 | 0.0 | 1.231E 00 | 4.217E 00 |
| −7.418 | −26.007 | 1.4280 | 6.369E 05 | 6.168E-02 | 1.174E 00 | 4.259E 00 |
| −14.836 | −18.863 | 1.4360 | 1.287E 06 | 1.335E-01 | 1.113E 00 | 4.304E 00 |
| −22.253 | −11.876 | 1.4440 | 1.951E 06 | 2.179E-01 | 1.047E 00 | 4.350E 00 |
| −29.671 | −5.097 | 1.4440 | 2.630E 06 | 3.144E-01 | 9.936E-01 | 4.398E 00 |
| −37.089 | 1.663 | 1.4520 | 3.326E 06 | 4.332E-01 | 9.239E-01 | 4.449E 00 |
| −44.507 | 8.276 | 1.4600 | 4.038E 06 | 5.776E-01 | 8.526E-01 | 4.501E 00 |
| −51.925 | 14.907 | 1.4600 | 4.767E 06 | 7.480E-01 | 7.968E-01 | 4.555E 00 |
| −59.342 | 21.304 | 1.4680 | 5.515E 06 | 9.713E-01 | 7.239E-01 | 4.610E 00 |
| −66.760 | 27.863 | 1.4680 | 6.281E 06 | 1.247E 00 | 6.667E-01 | 4.667E 00 |

PLASMA CURRENT = 9000000.00 AMPERES

| A | B | R | PO | BETA | Q | PSI |
|---|---|---|---|---|---|---|
| 0.0 | −37.474 | 1.4200 | 0.0 | 0.0 | 1.131E 00 | 4.744E 00 |
| −8.345 | −29.258 | 1.4280 | 8.060E 05 | 7.382E-02 | 1.073E 00 | 4.792E 00 |
| −16.690 | −21.221 | 1.4360 | 1.629E 06 | 1.617E-01 | 1.011E 00 | 4.842E 00 |
| −25.035 | −13.360 | 1.4440 | 2.469E 06 | 2.675E-01 | 9.451E-01 | 4.893E 00 |
| −33.380 | −5.734 | 1.4440 | 3.329E 06 | 3.923E-01 | 8.895E-01 | 4.948E 00 |
| −41.725 | 1.871 | 1.4520 | 4.209E 06 | 5.511E-01 | 8.192E-01 | 5.005E 00 |
| −50.070 | 9.311 | 1.4600 | 5.110E 06 | 7.524E-01 | 7.470E-01 | 5.063E 00 |
| −58.415 | 16.771 | 1.4600 | 6.034E 06 | 1.004E 00 | 6.877E-01 | 5.124E 00 |

PLASMA CURRENT = 10000000.00 AMPERES

| A | B | R | PO | BETA | Q | PSI |
|---|---|---|---|---|---|---|
| 0.0 | −41.638 | 1.4200 | 0.0 | 0.0 | 1.053E 00 | 5.272E 00 |
| −9.272 | −32.509 | 1.4280 | 9.951E 05 | 8.592E-02 | 9.947E-01 | 5.324E 00 |
| −18.544 | −23.579 | 1.4360 | 2.011E 06 | 1.904E-01 | 9.316E-01 | 5.380E 00 |
| −27.817 | −14.845 | 1.4440 | 3.049E 06 | 3.195E-01 | 8.648E-01 | 5.437E 00 |
| −37.089 | −6.371 | 1.4440 | 4.110E 06 | 4.768E-01 | 8.069E-01 | 5.498E 00 |
| −46.361 | 2.079 | 1.4520 | 5.197E 06 | 6.843E-01 | 7.351E-01 | 5.561E 00 |
| −55.633 | 10.345 | 1.4600 | 6.309E 06 | 9.605E-01 | 6.612E-01 | 5.626E 00 |
| −64.906 | 18.634 | 1.4600 | 7.449E 06 | 1.329E 00 | 5.977E-01 | 5.693E 00 |

RECTANGULAR CROSS SECTION EQUILIBRIA
AXIAL FIELD = 4.6000 TESLA
MAJOR RADIUS = 1.4000 METERS
MINOR SEMI-AXIS = 0.4000 METERS
RATIO OF SEMI-AXES = 2.5000

PLASMA CURRENT = 1000000.00 AMPERES

| A | B | R | PO | BETA | Q | PSI |
|---|---|---|---|---|---|---|
| 0.0 | −3.294 | 1.4280 | 0.0 | 0.0 | 1.225E 01 | 3.879E-01 |
| −0.742 | −2.601 | 1.4280 | 5.862E 03 | 7.225E-04 | 1.207E 01 | 3.920E-01 |
| −1.484 | −1.886 | 1.4360 | 1.185E 04 | 1.478E-03 | 1.177E 01 | 3.962E-01 |
| −2.225 | −1.201 | 1.4360 | 1.797E 04 | 2.242E-03 | 1.157E 01 | 4.005E-01 |
| −2.967 | 0.510 | 1.4440 | 2.421E 04 | 3.058E-03 | 1.121E 01 | 4.048E-01 |
| −3.709 | 0.168 | 1.4440 | 3.060E 04 | 3.867E-03 | 1.101E 01 | 4.093E-01 |
| −4.451 | 0.846 | 1.4440 | 3.712E 04 | 4.694E-03 | 1.081E 01 | 4.137E-01 |
| −5.192 | 1.507 | 1.4520 | 4.378E 04 | 5.602E-03 | 1.039E 01 | 4.183E-01 |
| −6.934 | 2.178 | 1.4520 | 5.059E 04 | 6.478E-03 | 1.019E 01 | 4.229E-01 |
| −6.676 | 2.848 | 1.4520 | 5.754E 04 | 7.374E-03 | 9.999E 00 | 4.276E-01 |
| −7.418 | 3.480 | 1.4600 | 6.464E 04 | 8.382E-03 | 9.557E 00 | 4.323E-01 |

PLASMA CURRENT = 2000000.00 AMPERES

| A | B | R | PO | BETA | Q | PSI |
|---|---|---|---|---|---|---|
| 0.0 | −6.588 | 1.4280 | 0.0 | 0.0 | 6.156E 00 | 7.758E-01 |
| −1.484 | −5.201 | 1.4280 | 2.345E 04 | 2.868E-03 | 6.059E 00 | 7.841E-01 |

TABLE I-continued

| A | B | R | PO | BETA | Q | PSI |
|---|---|---|---|---|---|---|
| −2.967 | −3.773 | 1.4360 | 4.739E 04 | 5.878E-03 | 5.902E 00 | 7.924E-01 |
| −4.451 | −2.402 | 1.4360 | 7.186E 04 | 8.936E-03 | 5.797E 00 | 8.010E-01 |
| −5.934 | −1.019 | 1.4440 | 9.684E 04 | 1.221E-02 | 5.611E 00 | 8.096E-01 |
| −7.418 | 0.336 | 1.4440 | 1.224E 05 | 1.548E-02 | 5.502E 00 | 8.186E-01 |
| −8.901 | 1.692 | 1.4440 | 1.485E 05 | 1.883E-02 | 5.397E 00 | 8.275E-01 |
| −10.385 | 3.014 | 1.4520 | 1.751E 05 | 2.252E-02 | 5.184E 00 | 8.366E-01 |
| −11.868 | 4.355 | 1.4520 | 2.024E 05 | 2.610E-02 | 5.078E 00 | 8.459E-01 |
| −13.352 | 5.696 | 1.4520 | 2.301E 05 | 2.978E-02 | 4.976E 00 | 8.551E-01 |
| −14.836 | 6.960 | 1.4600 | 2.585E 05 | 3.393E-02 | 4.750E 00 | 8.646E-01 |

PLASMA CURRENT = 3000000.00 AMPERES

| A | B | R | PO | BETA | Q | PSI |
|---|---|---|---|---|---|---|
| 0.0 | −9.882 | 1.4280 | 0.0 | | 4.136E 00 | 1.164E 00 |
| −2.225 | −7.802 | 1.4280 | 5.275E 04 | 6.373E-03 | 4.065E 00 | 1.176E 00 |
| −4.451 | −5.659 | 1.4360 | 1.066E 05 | 1.310E-02 | 3.953E 00 | 1.189E 00 |
| −6.676 | −3.603 | 1.4360 | 1.617E 05 | 1.999E-02 | 3.877E 00 | 1.202E 00 |
| −8.901 | −1.529 | 1.4440 | 2.179E 05 | 2.740E-02 | 3.746E 00 | 1.214E 00 |
| −11.127 | 0.505 | 1.4440 | 2.754E 05 | 3.485E-02 | 3.666E 00 | 1.228E 00 |
| −13.352 | 2.538 | 1.4440 | 3.341E 05 | 4.255E-02 | 3.590E 00 | 1.241E 00 |
| −15.577 | 4.522 | 1.4520 | 3.940E 05 | 5.109E-02 | 3.442E 00 | 1.255E 00 |
| −17.803 | 6.533 | 1.4520 | 4.553E 05 | 5.944E-02 | 3.365E 00 | 1.269E 00 |
| −20.028 | 8.544 | 1.4520 | 5.178E 05 | 6.808E-02 | 3.291E 00 | 1.283E 00 |
| −22.253 | 10.440 | 1.4600 | 5.817E 05 | 7.789E-02 | 3.135E 00 | 1.297E 00 |

PLASMA CURRENT = 4000000.00 AMPERES

| A | B | R | PO | BETA | Q | PSI |
|---|---|---|---|---|---|---|
| 0.0 | −13.175 | 1.4280 | 0.0 | 0.0 | 3.136E 00 | 1.552E 00 |
| −2.967 | −10.403 | 1.4280 | 9.379E 04 | 1.114E-02 | 3.075E 00 | 1.568E 00 |
| −5.934 | −7.545 | 1.4360 | 1.896E 05 | 2.300E-02 | 2.984E 00 | 1.585E 00 |
| −8.901 | −4.803 | 1.4360 | 2.874E 05 | 3.524E-02 | 2.920E 00 | 1.602E 00 |
| −11.868 | −2.039 | 1.4440 | 3.874E 05 | 4.854E-02 | 2.814E 00 | 1.619E 00 |
| −14.836 | 0.673 | 1.4440 | 4.896E 05 | 6.203E-02 | 2.748E 00 | 1.637E 00 |
| −17.803 | 3.384 | 1.4440 | 5.939E 05 | 7.613E-02 | 2.684E 00 | 1.655E 00 |
| −20.770 | 6.029 | 1.4520 | 7.005E 05 | 9.188E-02 | 2.567E 00 | 1.673E 00 |
| −23.737 | 8.711 | 1.4520 | 8.094E 05 | 1.075E-01 | 2.502E 00 | 1.692E 00 |
| −26.704 | 11.392 | 1.4520 | 9.206E 05 | 1.238E-01 | 2.440E 00 | 1.710E 00 |
| −29.671 | 13.920 | 1.4600 | 1.034E 06 | 1.425E-01 | 2.318E 00 | 1.729E 00 |

PLASMA CURRENT = 5000000.00 AMPERES

| A | B | R | PO | BETA | Q | PSI |
|---|---|---|---|---|---|---|
| 0.0 | −16.469 | 1.4280 | 0.0 | | 2.542E 00 | 1.940E 00 |
| −3.709 | −13.003 | 1.4280 | 1.465E 05 | 1.703E-02 | 2.487E 00 | 1.960E 00 |
| −7.418 | −9.432 | 1.4360 | 2.962E 05 | 3.535E-02 | 2.407E 00 | 1.981E 00 |
| −11.127 | −6.004 | 1.4360 | 4.491E 05 | 5.447E-02 | 2.348E 00 | 2.003E 00 |
| −14.836 | −2.549 | 1.4440 | 6.053E 05 | 7.549E-02 | 2.257E 00 | 2.024E 00 |
| −18.544 | 0.841 | 1.4440 | 7.649E 05 | 9.708E-02 | 2.197E 00 | 2.046E 00 |
| −22.253 | 4.230 | 1.4440 | 9.280E 05 | 1.199E-01 | 2.138E 00 | 2.069E 00 |
| −25.962 | 7.536 | 1.4520 | 1.095E 06 | 1.457E-01 | 2.038E 00 | 2.091E 00 |
| −29.671 | 10.888 | 1.4520 | 1.265E 06 | 1.718E-01 | 1.980E 00 | 2.115E 00 |
| ×33.380 | 14.240 | 1.4520 | 1.438E 06 | 1.994E-01 | 1.923E 00 | 2.138E 00 |
| −37.089 | 17.400 | 1.4600 | 1.616E 06 | 2.314E-01 | 1.819E 00 | 2.161E 00 |

PLASMA CURRENT = 6000000.00 AMPERES

| A | B | R | PO | BETA | Q | PSI |
|---|---|---|---|---|---|---|
| 0.0 | −19.763 | 1.4280 | 0.0 | 0.0 | 2.153E 00 | 2.328E 00 |
| −4.451 | −15.604 | 1.4280 | 2.110E 05 | 2.389E-02 | 2.099E 00 | 2.352E 00 |
| −8.901 | −11.318 | 1.4360 | 4.265E 05 | 4.992E-02 | 2.025E 00 | 2.377E 00 |
| −13.352 | −7.205 | 1.4360 | 6.468E 05 | 7.744E-02 | 1.969E 00 | 2.403E 00 |
| −17.803 | −3.058 | 1.4440 | 8.716E 05 | 1.081E-01 | 1.886E 00 | 2.429E 00 |
| −22.253 | 1.009 | 1.4440 | 1.102E 06 | 1.401E-01 | 1.829E 00 | 2.456E 00 |
| −26.704 | 5.076 | 1.4440 | 1.336E 06 | 1.744E-01 | 1.773E 00 | 2.482E 00 |
| −31.155 | 9.043 | 1.4520 | 1.576E 06 | 2.139E-01 | 1.682E 00 | 2.510E 00 |
| −35.605 | 13.066 | 1.4520 | 1.821E 06 | 2.544E-01 | 1.627E 00 | 2.538E 00 |
| −40.056 | 17.089 | 1.4520 | 2.071E 06 | 2.983E-01 | 1.572E 00 | 2.565E 00 |
| −44.507 | 20.880 | 1.4600 | 2.327E 06 | 3.499E-01 | 1.479E 00 | 2.594E 00 |

PLASMA CURRENT = 7000000.00 AMPERES

| A | B | R | PO | BETA | Q | PSI |
|---|---|---|---|---|---|---|
| 0.0 | −23.057 | 1.4280 | 0.0 | 0.0 | 1.879E 00 | 2.715E 00 |
| −5.192 | −18.205 | 1.4280 | 2.872E 05 | 3.156E-02 | 1.826E 00 | 2.744E 00 |
| −10.385 | −13.204 | 1.4360 | 5.806E 05 | 6.642E-02 | 1.756E 00 | 2.774E 00 |
| −15.577 | −8.406 | 1.4360 | 8.803E 05 | 1.038E-01 | 1.701E 00 | 2.804E 00 |
| −20.770 | −3.568 | 1.4440 | 1.186E 06 | 1.461E-01 | 1.622E 00 | 2.834E 00 |
| −25.962 | 1.177 | 1.4440 | 1.499E 06 | 1.911E-01 | 1.566E :0 | 2.865E 00 |
| −31.155 | 5.922 | 1.4440 | 1.819E 06 | 2.403E-01 | 1.511E 00 | 2.896E 00 |
| −36.347 | 10.550 | 1.4520 | 2.145E 06 | 2.978E-01 | 1.426E 00 | 2.928E 00 |
| −41.540 | 15.244 | 1.4520 | 2.479E 06 | 3.583E-01 | 1.370E 00 | 2.960E 00 |
| −46.732 | 19.937 | 1.4520 | 2.819E 06 | 4.256E-01 | 1.316E 00 | 2.993E 00 |
| −51.924 | 24.360 | 1.4600 | 3.167E 06 | 5.063E-01 | 1.230E 00 | 3.026E 00 |

PLASMA CURRENT = 8000000.00 AMPERES

| A | B | R | PO | BETA | Q | PSI |
|---|---|---|---|---|---|---|
| 0.0 | −26.351 | 1.4280 | 0.0 | 0.0 | 1.678E 00 | 3.103E 00 |
| −5.934 | −20.805 | 1.4280 | 3.751E 05 | 3.988E-02 | 1.625E 00 | 3.136E 00 |
| −11.868 | −15.091 | 1.4360 | 7.583E 05 | 8.457E-02 | 1.556E 00 | 3.170E 00 |
| −17.803 | −9.607 | 1.4360 | 1.150E 06 | 1.333E-01 | 1.501E 00 | 3.204E 00 |
| −23.737 | −4.078 | 1.4440 | 1.550E 06 | 1.894E-01 | 1.425E 00 | 3.238E 00 |
| −29.671 | 1.345 | 1.4440 | 1.948E 06 | 2.502E-01 | 1.368E 00 | 3.274E 00 |
| −35.605 | 6.769 | 1.4440 | 2.376E 06 | 3.183E-01 | 1.312E 00 | 3.310E 00 |
| −41.540 | 12.058 | 1.4520 | 2.802E 06 | 3.995E-01 | 1.231E 00 | 3.346E 00 |
| −47.474 | 17.421 | 1.4520 | 3.238E 06 | 4.877E-01 | 1.175E 00 | 3.383E 00 |
| −53.408 | 22.785 | 1.4520 | 3.682E 06 | 5.886E-01 | 1.119E 00 | 3.420E 00 |

TABLE I-continued

| A | B | R | PO | BETA | Q | PSI |
|---|---|---|---|---|---|---|
| −59.342 | 27.841 | 1.4600 | 4.137E 06 | 7.131E-01 | 1.036E 00 | 3.458E 00 |

PLASMA CURRENT = 9000000.00 AMPERES

| A | B | R | PO | BETA | Q | PSI |
|---|---|---|---|---|---|---|
| 0.0 | −29.645 | 1.4280 | 0.0 | 0.0 | 1.525E 00 | 3.491E 00 |
| −6.676 | −23.406 | 1.4280 | 4.748E 05 | 4.866E-02 | 1.471E 00 | 3.528E 00 |
| −13.352 | −16.977 | 1.4360 | 9.597E 05 | 1.041E-01 | 1.403E 00 | 3.566E 00 |
| −20.028 | −10.808 | 1.4360 | 1.455E 06 | 1.656E-01 | 1.347E 00 | 3.605E 00 |
| −26.704 | −4.587 | 1.4440 | 1.961E 06 | 2.377E-01 | 1.272E 00 | 3.643E 00 |
| −33.380 | 1.514 | 1.4440 | 2.478E 06 | 3.177E-01 | 1.214E 00 | 3.683E 00 |
| −40.056 | 7.615 | 1.4440 | 3.007E 06 | 4.095E-01 | 1.157E 00 | 3.724E 00 |
| −46.732 | 13.565 | 1.4520 | 3.546E 06 | 5.217E-01 | 1.077E 00 | 3.765E 00 |
| −53.408 | 19.599 | 1.4520 | 4.098E 06 | 6.480E-01 | 1.019E 00 | 3.806E 00 |
| −60.084 | 25.633 | 1.4520 | 4.660E 06 | 7.981E-01 | 9.611E-01 | 3.848E 00 |
| −66.760 | 31.321 | 1.4600 | 5.236E 06 | 9.905E-01 | 8.792E-01 | 3.891E 00 |

PLASMA CURRENT = 10000000.00 AMPERES

| A | B | R | PO | BETA | Q | PSI |
|---|---|---|---|---|---|---|
| 0.0 | −32.938 | 1.4280 | 0.0 | 0.0 | 1.405E 00 | 3.879E 00 |
| −7.418 | −26.007 | 1.4280 | 5.862E 05 | 5.776E-02 | 1.350E 00 | 3.920E 00 |
| −14.836 | −18.863 | 1.4360 | 1.185E 06 | 1.246E-01 | 1.282E 00 | 3.962E 00 |
| −22.253 | −12.009 | 1.4360 | 1.797E 06 | 2.002E-01 | 1.225E 00 | 4.005E 00 |
| −29.671 | −5.097 | 1.4440 | 2.421E 06 | 2.906E-01 | 1.150E 00 | 4.048E 00 |
| −37.089 | 1.682 | 1.4440 | 3.060E 06 | 3.935E-01 | 1.091E 00 | 4.093E 00 |
| −44.507 | 8.461 | 1.4440 | 3.712E 06 | 5.149E-01 | 1.032E 00 | 4.137E 00 |
| −51.925 | 15.072 | 1.4520 | 4.378E 06 | 6.677E-01 | 9.520E-01 | 4.183E 00 |
| −59.342 | 21.776 | 1.4520 | 5.059E 06 | 8.473E-01 | 8.913E-01 | 4.229E 00 |
| −66.760 | 28.481 | 1.4520 | 5.754E 06 | 1.071E 00 | 8.297E-01 | 4.276E 00 |

RECTANGULAR CROSS SECTION EQUILIBRIA
  AXIAL FIELD = 4.6000 TESLA
  MAJOR RADIUS = 1.4000 METERS
  MINOR SEMI-AXIS = 0.4000 METERS
  RATIO OF SEMI-AXES = 3.0000

PLASMA CURRENT = 1000000.00 AMPERES

| A | B | R | PO | BETA | Q | PSI |
|---|---|---|---|---|---|---|
| 0.0 | −2.745 | 1.4280 | 0.0 | 0.0 | 1.689E 01 | 2.659E-01 |
| −0.618 | −2.167 | 1.4280 | 3.352E 03 | 4.136E-04 | 1.664E 01 | 2.690E-01 |
| −1.236 | −1.590 | 1.4280 | 6.782E 03 | 8.371E-04 | 1.640E 01 | 2.721E-01 |
| −1.854 | −1.001 | 1.4360 | 1.029E 04 | 1.285E-03 | 1.596E 01 | 2.753E-01 |
| −2.473 | −0.430 | 1.4360 | 1.388E 04 | 1.733E-03 | 1.570E 01 | 2.784E-01 |
| −3.091 | 0.142 | 1.4360 | 1.754E 04 | 2.192E-03 | 1.545E 01 | 2.816E-01 |
| −3.709 | 0.713 | 1.4360 | 2.129E 04 | 2.661E-03 | 1.520E 01 | 2.847E-01 |
| −4.327 | 1.284 | 1.4360 | 2.511E 04 | 3.140E-03 | 1.496E 01 | 2.879E-01 |
| −4.945 | 1.855 | 1.4360 | 2.901E 04 | 3.630E-03 | 1.473E 01 | 2.910E-01 |
| −5.563 | 2.427 | 1.4360 | 3.299E 04 | 4.130E-03 | 1.451E 01 | 2.942E-01 |
| −6.181 | 2.998 | 1.4360 | 3.705E 04 | 4.640E-03 | 1.429E 01 | 2.973E-01 |

PLASMA CURRENT = 2000000.00 AMPERES

| A | B | R | PO | BETA | Q | PSI |
|---|---|---|---|---|---|---|
| 0.0 | −5.490 | 1.4280 | 0.0 | 0.0 | 8.469E 00 | 5.318E-01 |
| −1.236 | −4.334 | 1.4280 | 1.341E 04 | 1.647E-03 | 8.339E 00 | 5.380E-01 |
| −2.473 | −3.179 | 1.4280 | 2.713E 04 | 3.338E-03 | 8.214E 00 | 5.443E-01 |
| −3.709 | −2.001 | 1.4360 | 4.116E 04 | 5.129E-03 | 7.988E 00 | 5.506E-01 |
| −4.945 | −0.859 | 1.4360 | 5.551E 04 | 6.928E-03 | 7.853E 00 | 5.568E-01 |
| −6.181 | 0.283 | 1.4360 | 7.017E 04 | 8.772E-03 | 7.722E 00 | 5.631E-01 |
| −7.418 | 1.426 | 1.4360 | 8.514E 04 | 1.066E-02 | 7.595E 00 | 5.694E-01 |
| −8.654 | 2.568 | 1.4360 | 1.004E 05 | 1.260E-02 | 7.471E 00 | 5.757E-01 |
| −9.890 | 3.711 | 1.4360 | 1.160E 05 | 1.458E-02 | 7.351E 00 | 5.820E-01 |
| −11.127 | 4.853 | 1.4360 | 1.320E 05 | 1.661E-02 | 7.235E 00 | 5.884E-01 |
| −12.363 | 5.996 | 1.4360 | 1.482E 05 | 1.868E-02 | 7.122E 00 | 5.946E-01 |

PLASMA CURRENT = 3000000.00 AMPERES

| A | B | R | PO | BETA | Q | PSI |
|---|---|---|---|---|---|---|
| 0.0 | −8.235 | 1.4280 | 0.0 | 0.0 | 5.671E 00 | 7.977E-01 |
| −1.854 | −6.502 | 1.4280 | 3.017E 04 | 3.680E-03 | 5.580E 00 | 8.070E-01 |
| −3.709 | −4.769 | 1.4280 | 6.103E 04 | 7.470E-03 | 5.490E 00 | 8.164E-01 |
| −5.563 | −3.002 | 1.4360 | 9.261E 04 | 1.150E-02 | 5.335E 00 | 8.258E-01 |
| −7.418 | −1.289 | 1.4360 | 1.249E 05 | 1.556E-02 | 5.239E 00 | 8.353E-01 |
| −9.272 | 0.425 | 1.4360 | 1.579E 05 | 1.975E-02 | 5.147E 00 | 8.447E-01 |
| −11.127 | 2.139 | 1.4360 | 1.916E 05 | 2.405E-02 | 5.057E 00 | 8.542E-01 |
| −12.981 | 3.852 | 1.4360 | 2.260E 05 | 2.848E-02 | 4.969E 00 | 8.636E-01 |
| −14.836 | 5.566 | 1.4360 | 2.611E 05 | 3.303E-02 | 4.884E 00 | 8.731E-01 |
| −16.690 | 7.280 | 1.4360 | 2.969E 05 | 3.771E-02 | 4.801E 00 | 8.825E-01 |
| −18.544 | 8.993 | 1.4360 | 3.334E 05 | 4.252E-02 | 4.721E 00 | 8.920E-01 |

PLASMA CURRENT = 4000000.00 AMPERES

| A | B | R | PO | BETA | Q | PSI |
|---|---|---|---|---|---|---|
| 0.0 | −10.979 | 1.4280 | 0.0 | 0.0 | 4.280E 00 | 1.064E 00 |
| −2.473 | −8.669 | 1.4280 | 5.363E 04 | 6.477E-03 | 4.206E 00 | 1.076E 00 |
| −4.945 | −6.358 | 1.4280 | 1.085E 05 | 1.318E-02 | 4.133E 00 | 1.089E 00 |
| −7.418 | −4.003 | 1.4360 | 1.646E 05 | 2.035E-02 | 4.011E 00 | 1.101E 00 |
| −9.890 | −1.718 | 1.4360 | 2.220E 05 | 2.761E-02 | 3.934E 00 | 1.114E 00 |
| −12.363 | 0.567 | 1.4360 | 2.807E 05 | 3.513E-02 | 3.859E 00 | 1.126E 00 |
| −14.836 | 2.852 | 1.4360 | 3.406E 05 | 4.291E-02 | 3.786E 00 | 1.139E 00 |
| −17.308 | 5.137 | 1.4360 | 4.017E 05 | 5.096E-02 | 3.715E 00 | 1.152E 00 |
| −19.781 | 7.421 | 1.4360 | 4.642E 05 | 5.929E-02 | 3.645E 00 | 1.164E 00 |
| −22.253 | 9.706 | 1.4360 | 5.278E 05 | 6.791E-02 | 3.578E 00 | 1.177E 00 |
| −24.726 | 11.991 | 1.4360 | 5.928E 05 | 7.683E-02 | 3.512E 00 | 1.189E 00 |

PLASMA CURRENT = 5000000.00 AMPERES

TABLE I-continued

| A | B | R | PO | BETA | Q | PSI |
|---|---|---|---|---|---|---|
| 0.0 | −13.724 | 1.4280 | 0.0 | 0.0 | 3.451E 00 | 1.329E 00 |
| −3.091 | −10.836 | 1.4280 | 8.380E 04 | 9.992E-03 | 3.386E 00 | 1.345E 00 |
| −6.181 | −7.948 | 1.4280 | 1.695E 05 | 2.040E-02 | 3.322E 00 | 1.361E 00 |
| −9.272 | −5.004 | 1.4360 | 2.573E 05 | 3.160E-02 | 3.218E 00 | 1.376E 00 |
| −12.363 | −2.148 | 1.4360 | 3.469E 05 | 4.303E-02 | 3.151E 00 | 1.392E 00 |
| −15.454 | 0.709 | 1.4360 | 4.386E 05 | 5.494E-02 | 3.085E 00 | 1.408E 00 |
| −18.544 | 3.565 | 1.4360 | 5.322E 05 | 6.736E-02 | 3.021E 00 | 1.424E 00 |
| −21.635 | 6.421 | 1.4360 | 6.277E 05 | 8.031E-02 | 2.959E 00 | 1.439E 00 |
| −24.726 | 9.277 | 1.4360 | 7.252E 05 | 9.381E-02 | 2.898E 00 | 1.455E 00 |
| −27.817 | 12.133 | 1.4360 | 8.247E 05 | 1.079E-01 | 2.838E 00 | 1.471E 00 |
| −30.907 | 14.989 | 1.4360 | 9.262E 05 | 1.226E-01 | 2.780E 00 | 1.487E 00 |

PLASMA CURRENT = 6000000.00 AMPERES

| A | B | R | PO | BETA | Q | PSI |
|---|---|---|---|---|---|---|
| 0.0 | −16.469 | 1.4280 | 0.0 | 0.0 | 2.903E 00 | 1.595E 00 |
| −3.709 | −13.003 | 1.4280 | 1.207E 05 | 1.417E-02 | 2.843E 00 | 1.614E 00 |
| −7.418 | −9.538 | 1.4280 | 2.441E 05 | 2.904E-02 | 2.784E 00 | 1.633E 00 |
| −11.127 | −6.004 | 1.4360 | 3.704E 05 | 4.516E-02 | 2.692E 00 | 1.652E 00 |
| −14.836 | −2.577 | 1.4360 | 4.996E 05 | 6.176E-02 | 2.630E 00 | 1.671E 00 |
| −18.544 | 0.850 | 1.4360 | 6.315E 05 | 7.920E-02 | 2.570E 00 | 1.689E 00 |
| −22.253 | 4.278 | 1.4360 | 7.663E 05 | 9.755E-02 | 2.511E 00 | 1.708E 00 |
| −25.962 | 7.705 | 1.4360 | 9.039E 05 | 1.169E-01 | 2.453E 00 | 1.727E 00 |
| −29.671 | 11.132 | 1.4360 | 1.044E 06 | 1.372E-01 | 2.396E 00 | 1.746E 00 |
| −33.380 | 14.560 | 1.4360 | 1.188E 06 | 1.587E-01 | 2.341E 00 | 1.765E 00 |
| −37.089 | 17.987 | 1.4360 | 1.334E 06 | 1.813E-01 | 2.286E 00 | 1.784E 00 |

PLASMA CURRENT = 7000000.00 AMPERES

| A | B | R | PO | BETA | Q | PSI |
|---|---|---|---|---|---|---|
| 0.0 | −19.214 | 1.4280 | 0.0 | 0.0 | 2.515E 00 | 1.861E 00 |
| −4.327 | −15.171 | 1.4280 | 1.642E 05 | 1.895E-02 | 2.459E 00 | 1.883E 00 |
| −8.654 | −11.127 | 1.4280 | 3.323E 05 | 3.900E-02 | 2.403E 00 | 1.905E 00 |
| −12.981 | −7.005 | 1.4360 | 5.042E 05 | 6.093E-02 | 2.318E 00 | 1.927E 00 |
| −17.308 | −3.007 | 1.4360 | 6.800E 05 | 8.373E-02 | 2.259E 00 | 1.949E 00 |
| −21.635 | 0.992 | 1.4360 | 8.596E 05 | 1.079E-01 | 2.201E 00 | 1.971E 00 |
| −25.962 | 4.991 | 1.4360 | 1.043E 06 | 1.337E-01 | 2.145E 00 | 1.993E 00 |
| −30.289 | 8.989 | 1.4360 | 1.230E 06 | 1.611E-01 | 2.089E 00 | 2.015E 00 |
| −34.616 | 12.988 | 1.4360 | 1.421E 06 | 1.903E-01 | 2.035E 00 | 2.037E 00 |
| −38.943 | 16.986 | 1.4360 | 1.616E 06 | 2.215E-01 | 1.981E 00 | 2.059E 00 |
| −43.270 | 20.985 | 1.4360 | 1.815E 06 | 2.549E-01 | 1.928E 00 | 2.081E 00 |

PLASMA CURRENT = 8000000.00 AMPERES

| A | B | R | PO | BETA | Q | PSI |
|---|---|---|---|---|---|---|
| 0.0 | −21.959 | 1.4280 | 0.0 | 0.0 | 2.229E 00 | 2.127E 00 |
| −4.945 | −17.338 | 1.4280 | 2.145E 05 | 2.425E-02 | 2.173E 00 | 2.152E 00 |
| −9.890 | −12.717 | 1.4280 | 4.340E 05 | 5.017E-02 | 2.118E 00 | 2.177E 00 |
| −14.836 | −8.006 | 1.4360 | 6.586E 05 | 7.879E-02 | 2.038E 00 | 2.202E 00 |
| −19.781 | −3.436 | 1.4360 | 8.881E 05 | 1.089E-01 | 1.981E 00 | 2.227E 00 |
| −24.726 | 1.134 | 1.4360 | 1.123E 06 | 1.412E-01 | 1.925E 00 | 2.253E 00 |
| −29.671 | 5.703 | 1.4360 | 1.362E 06 | 1.760E-01 | 1.869E 00 | 2.278E 00 |
| −34.616 | 10.273 | 1.4360 | 1.607E 06 | 2.135E-01 | 1.815E 00 | 2.303E 00 |
| −39.562 | 14.843 | 1.4360 | 1.857E 06 | 2.541E-01 | 1.761E 00 | 2.328E 00 |
| −44.507 | 19.413 | 1.4360 | 2.111E 06 | 2.981E-01 | 1.708E 00 | 2.353E 00 |
| −49.452 | 23.982 | 1.4360 | 2.371E 06 | 3.460E-01 | 1.655E 00 | 2.379E 00 |

PLASMA CURRENT = 9000000.00 AMPERES

| A | B | R | PO | BETA | Q | PSI |
|---|---|---|---|---|---|---|
| 0.0 | −24.704 | 1.4280 | 0.0 | 0.0 | 2.008E 00 | 2.393E 00 |
| −5.563 | −19.505 | 1.4280 | 2.715E 05 | 3.002E-02 | 1.953E 00 | 2.421E 00 |
| −11.127 | −14.306 | 1.4280 | 5.493E 05 | 6.243E-02 | 1.899E 00 | 2.449E 00 |
| −16.690 | −9.006 | 1.4360 | 8.335E 05 | 9.861E-02 | 1.822E 00 | 2.478E 00 |
| −22.253 | −3.866 | 1.4360 | 1.124E 06 | 1.371E-01 | 1.765E 00 | 2.506E 00 |
| −27.817 | 1.275 | 1.4360 | 1.421E 06 | 1.790E-01 | 1.709E 00 | 2.534E 00 |
| −33.380 | 6.416 | 1.4360 | 1.724E 06 | 2.248E-01 | 1.654E 00 | 2.563E 00 |
| −38.943 | 11.557 | 1.4360 | 2.034E 06 | 2.749E-01 | 1.599E 00 | 2.591E 00 |
| −44.507 | 16.698 | 1.4360 | 2.350E 06 | 3.300E-01 | 1.545E 00 | 2.619E 00 |
| −50.070 | 21.839 | 1.4360 | 2.672E 06 | 3.908E-01 | 1.491E 00 | 2.648E 00 |
| −55.633 | 26.980 | 1.4360 | 3.001E 06 | 4.583E-01 | 1.438E 00 | 2.676E 00 |

PLASMA CURRENT = 10000000.00 AMPERES

| A | B | R | PO | BETA | Q | PSI |
|---|---|---|---|---|---|---|
| 0.0 | −27.449 | 1.4280 | 0.0 | 0.0 | 1.835E 00 | 2.659E 00 |
| −6.181 | −21.672 | 1.4280 | 3.352E 05 | 3.617E-02 | 1.780E 00 | 2.690E 00 |
| −12.363 | −15.896 | 1.4280 | 6.782E 05 | 7.565E-02 | 1.725E 00 | 2.721E 00 |
| −18.544 | −10.007 | 1.4360 | 1.029E 06 | 1.202E-01 | 1.650E 00 | 2.753E 00 |
| −24.726 | −4.295 | 1.4360 | 1.388E 06 | 1.683E-01 | 1.593E 00 | 2.784E 00 |
| −30.907 | 1.417 | 1.4360 | 1.754E 06 | 2.214E-01 | 1.537E 00 | 2.816E 00 |
| −37.089 | 7.129 | 1.4360 | 2.129E 06 | 2.803E-01 | 1.481E 00 | 2.847E 00 |
| −43.270 | 12.842 | 1.4360 | 2.511E 06 | 3.460E-01 | 1.426E 00 | 2.879E 00 |
| −49.452 | 18.554 | 1.4360 | 2.901E 06 | 4.196E-01 | 1.370E 00 | 2.910E 00 |
| −55.633 | 24.266 | 1.4360 | 3.299E 06 | 5.026E-01 | 1.315E 00 | 2.942E 00 |
| −61.815 | 29.978 | 1.4360 | 3.705E 06 | 5.969E-01 | 1.260E 00 | 2.973E 00 |

What is claimed is:

1. In the method of confining and stabilizing a plasma current carrying toroidal plasma column in a tokamak having toroidal and poloidal coil means for producing toroidal magnetic surfaces along an equilibrium axis around an axis of rotation, the improvement, comprising the steps of:

a. producing a toroidal plasma column in the magnetic surfaces; and b. distributing over the plasma region a non-helical octupole magnetic field around the outside of the plasma column and in the space between the equilibrium axis and the axis of rotation for producing poloidal separatrices external to the plasma column having stagnation points and magnetic field lines that define in cross-section an elongated magnetic surface having a D-shaped poloidal divertor cross-section, said toroidal plasma column having external shell currents computed to make the edge of the plasma region the $\Psi = 0$ magnetic surface.

2. The method of claim 1 in which said external shell currents and plasma currents produce an elongated plasma column in said magnetic field.

3. The method of claim 2 in which the major radius at the center of the plasma column is at least 1.275 meters, the area of the plasma column cross-section is 0.98 square meters, and the semi-axis ratio is between 1.6 and 3.2.

4. The method of claim 3 in which the external shell currents and plasma currents produce an external magnetic limiter around the plasma outside diameter and four, non-helical, co-axial poloidal divertors having a D-shape in cross-section centered on four co-axial circles at the edges of a rectangle for removing impurities.

5. In the method of confining and stabilizing a plasma current carrying toroidal plasma column in a tokamak having toroidal and poloidal coil means for producing toroidal magnetic surfaces along an equilibrium axis around an axis of rotation, the improvement comprising the steps of:

a. producing a toroidal plasma column in concentric, circular cross-section, toroidal magnetic surfaces having a poloidal separatrix along an equilibrium axis and plasma particles that diffuse outwardly away from the equilibrium axis toward the sepatrix; and b. imposing on the outside of the toroidal plasma column a magnetic field having spaced apart non-helical poloidal currents that are co-axial with the equilibrium axis for effecting the changing of the outer magnetic surface into an elongated, cross-section having an external separatrix forming a D-shaped poloidal divertor cross-section to bend the plasma particles away from the equilibrium axis and into the poloidal divertor in accordance with their diffusion away from the equilibrium axis toward the separatrix.

* * * * *